United States Patent
Verma et al.

(10) Patent No.: US 12,105,742 B2
(45) Date of Patent: Oct. 1, 2024

(54) PROVIDING DATA FLOW DIRECTIONS FOR DATA OBJECTS

(71) Applicant: Tableau Software, LLC, Seattle, WA (US)

(72) Inventors: Harsh Verma, Kirkland, WA (US); Ramakrishna Casturi, Redmond, WA (US); Tyler James-Buker Doyle, Seattle, WA (US); Arun Durairaju, Sammamish, WA (US); Tao Tao, Kirkland, WA (US)

(73) Assignee: Tableau Software, LLC, Seattle, WA (US)

( * ) Notice: Subject to any disclaimer, the term of this patent is extended or adjusted under 35 U.S.C. 154(b) by 58 days.

(21) Appl. No.: 17/589,492

(22) Filed: Jan. 31, 2022

(65) Prior Publication Data

US 2023/0065227 A1     Mar. 2, 2023

Related U.S. Application Data

(60) Provisional application No. 63/239,282, filed on Aug. 31, 2021.

(51) Int. Cl.
*G06F 16/28*     (2019.01)
*G06F 16/21*     (2019.01)
(Continued)

(52) U.S. Cl.
CPC .......... *G06F 16/288* (2019.01); *G06F 16/212* (2019.01); *G06F 16/2246* (2019.01); *G06F 16/26* (2019.01)

(58) Field of Classification Search
CPC .... G06F 16/288; G06F 16/2246; G06F 16/26; G06F 16/212
(Continued)

(56) References Cited

U.S. PATENT DOCUMENTS 5,550,971 A     8/1996  Brunner et al.
5,689,711 A     11/1997 Bardasz et al.
(Continued)

FOREIGN PATENT DOCUMENTS

WO     2006060773 A2     6/2006

OTHER PUBLICATIONS

Office Communication for U.S. Appl. No. 16/586,554 mailed Jul. 24, 2020, pp. 1-27.
(Continued)

*Primary Examiner* — Giovanna B Colan
(74) *Attorney, Agent, or Firm* — Morgan, Lewis & Bockius LLP

(57) ABSTRACT

Embodiments are directed to managing data. A data model that includes data type nodes and relationship edges may be provided. Other data types and other data type relationships may be provided and included in the data model. If a portion of the nodes in the data model may be downstream of leaf nodes in the graphlet: the data model may be traversed to visit the downstream nodes; shortcut edges may be generated to each downstream node associated with shortcut nodes. If a second portion of the nodes in the data model may be upstream of the leaf nodes: the data model may be traversed upwards from the leaf nodes; other shortcut edges may be generated to each node visited in the upwards traversal associated with shortcut nodes.

20 Claims, 26 Drawing Sheets

(51) Int. Cl.
*G06F 16/22* (2019.01)
*G06F 16/26* (2019.01)

(58) Field of Classification Search
USPC .......................... 707/797; 715/853; 701/533
See application file for complete search history.

(56) References Cited

U.S. PATENT DOCUMENTS

| | | | |
|---|---|---|---|
| 6,804,677 B2* | 10/2004 | Shadmon | G06F 16/835 |
| | | | 707/E17.123 |
| 7,216,116 B1* | 5/2007 | Nilsson | G06F 16/2428 |
| 7,496,594 B1* | 2/2009 | Cummings | G06F 9/451 |
| | | | 717/121 |
| 8,286,087 B1 | 10/2012 | Xian et al. | |
| 9,383,913 B2 | 7/2016 | Hoyer et al. | |
| 9,489,119 B1 | 11/2016 | Smith, Jr. | |
| 9,760,240 B2 | 9/2017 | Maheshwari et al. | |
| 9,881,066 B1 | 1/2018 | Yousaf et al. | |
| 10,275,265 B1 | 4/2019 | Gould et al. | |
| 10,445,170 B1 | 10/2019 | Subramanian et al. | |
| 10,698,955 B1 | 6/2020 | Broecheler | |
| 10,705,695 B1 | 7/2020 | Porath et al. | |
| 10,783,162 B1 | 9/2020 | Montague et al. | |
| 2002/0111932 A1* | 8/2002 | Roberge | G16H 15/00 |
| 2004/0205562 A1 | 10/2004 | Rozek et al. | |
| 2006/0064674 A1 | 3/2006 | Olson, Jr. et al. | |
| 2008/0126987 A1 | 5/2008 | Meschian et al. | |
| 2009/0006939 A1 | 1/2009 | DeSpain et al. | |
| 2009/0007122 A1 | 1/2009 | Peyton et al. | |
| 2009/0012983 A1 | 1/2009 | Senneville et al. | |
| 2010/0114629 A1 | 5/2010 | Adler et al. | |
| 2010/0138420 A1 | 6/2010 | Bator et al. | |
| 2010/0235771 A1 | 9/2010 | Gregg, III | |
| 2010/0313157 A1 | 12/2010 | Carlsson et al. | |
| 2010/0318583 A1 | 12/2010 | Cohen | |
| 2011/0219321 A1 | 9/2011 | Gonzalez Veron et al. | |
| 2012/0311497 A1 | 12/2012 | Bear et al. | |
| 2014/0026084 A1 | 1/2014 | Gilboa | |
| 2014/0058789 A1 | 2/2014 | Doehring et al. | |
| 2014/0074888 A1 | 3/2014 | Potter et al. | |
| 2014/0114907 A1 | 4/2014 | Kozina et al. | |
| 2014/0215405 A1 | 7/2014 | Breedvelt-Schouten | |
| 2014/0267287 A1 | 9/2014 | Dodgen et al. | |
| 2014/0330821 A1 | 11/2014 | Tullis et al. | |
| 2014/0372956 A1 | 12/2014 | Bisca et al. | |
| 2015/0112998 A1 | 4/2015 | Shankar et al. | |
| 2015/0339263 A1 | 11/2015 | Abu El Ata et al. | |
| 2015/0347091 A1 | 12/2015 | Ferko et al. | |
| 2016/0078361 A1 | 3/2016 | Brueckner et al. | |
| 2016/0103908 A1 | 4/2016 | Fletcher et al. | |
| 2016/0162598 A1* | 6/2016 | Schaerges | G06F 16/185 |
| | | | 715/853 |
| 2016/0224532 A1 | 8/2016 | Miller et al. | |
| 2016/0224616 A1 | 8/2016 | Beacom et al. | |
| 2016/0232207 A1 | 8/2016 | Brunel et al. | |
| 2016/0314605 A1 | 10/2016 | Filippi et al. | |
| 2017/0010787 A1 | 1/2017 | Ranganathan et al. | |
| 2017/0075557 A1 | 3/2017 | Noble et al. | |
| 2017/0091317 A1 | 3/2017 | Cummings et al. | |
| 2017/0102694 A1 | 4/2017 | Enver et al. | |
| 2017/0103103 A1 | 4/2017 | Nixon et al. | |
| 2017/0140068 A1 | 5/2017 | Oh et al. | |
| 2017/0154088 A1 | 6/2017 | Sherman | |
| 2017/0161188 A1 | 6/2017 | Isoi | |
| 2017/0177681 A1 | 6/2017 | Potiagalov et al. | |
| 2017/0177744 A1 | 6/2017 | Potiagalov et al. | |
| 2017/0178368 A1 | 6/2017 | Noon et al. | |
| 2017/0193049 A1 | 7/2017 | Grehant | |
| 2017/0213131 A1 | 7/2017 | Hammond et al. | |
| 2017/0220633 A1 | 8/2017 | Porath et al. | |
| 2017/0286526 A1 | 10/2017 | Bar-Or et al. | |
| 2017/0293666 A1 | 10/2017 | Ragavan et al. | |
| 2017/0316355 A1 | 11/2017 | Shrestha et al. | |
| 2018/0024731 A1 | 1/2018 | Sanches et al. | |
| 2018/0067998 A1 | 3/2018 | Sherman et al. | |
| 2018/0129369 A1 | 5/2018 | Kim et al. | |
| 2018/0157702 A1 | 6/2018 | Clemens et al. | |
| 2018/0218050 A1 | 8/2018 | Porath et al. | |
| 2018/0260106 A1 | 9/2018 | Leonard et al. | |
| 2018/0260903 A1 | 9/2018 | Callery | |
| 2019/0034489 A1 | 1/2019 | Ziegler | |
| 2019/0095395 A1 | 3/2019 | Piecko | |
| 2019/0188308 A1 | 6/2019 | Simon et al. | |
| 2019/0286668 A1 | 9/2019 | Puzicha et al. | |
| 2019/0294720 A1 | 9/2019 | Beringer et al. | |
| 2019/0325292 A1 | 10/2019 | Remis et al. | |
| 2019/0332599 A1 | 10/2019 | Woo | |
| 2019/0384836 A1 | 12/2019 | Roth et al. | |
| 2020/0104401 A1 | 4/2020 | Burnett et al. | |
| 2020/0104402 A1 | 4/2020 | Burnett et al. | |
| 2020/0175006 A1 | 6/2020 | Hughes | |
| 2020/0285803 A1 | 9/2020 | Edge et al. | |
| 2020/0334277 A1 | 10/2020 | Doyle et al. | |
| 2020/0372057 A1 | 11/2020 | Tonkin et al. | |
| 2020/0401623 A1 | 12/2020 | Dilts et al. | |
| 2021/0263900 A1 | 8/2021 | Joyce et al. | |
| 2021/0390420 A1 | 12/2021 | Barnett | |
| 2022/0113150 A1* | 4/2022 | Hidayat | G01C 21/3461 |

OTHER PUBLICATIONS

Office Communication for U.S. Appl. No. 16/586,554 mailed Nov. 24, 2020, pp. 1-28.
Office Communication for U.S. Appl. No. 16/586,554 mailed Feb. 16, 2021, pp. 1-7.
Office Communication for U.S. Appl. No. 16/586,554 mailed Apr. 2, 2021, pp. 1-37.
Office Communication for U.S. Appl. No. 16/725,986 mailed Apr. 2, 2021, pp. 1-23.
Office Communication for U.S. Appl. No. 16/984,014 mailed Aug. 10, 2021, pp. 1-32.
Office Communication for U.S. Appl. No. 16/586,554 mailed Sep. 27, 2021, pp. 1-45.
Office Communication for U.S. Appl. No. 16/725,986 mailed Sep. 30, 2021, pp. 1-10.
Office Communication for U.S. Appl. No. 17/091,536 mailed Nov. 5, 2021, pp. 1-25.
Office Communication for U.S. Appl. No. 16/944,043 mailed Nov. 26, 2021, pp. 1-49.
Office Communication for U.S. Appl. No. 16/586,554 mailed Dec. 15, 2021, pp. 1-7.
Office Communication for U.S. Appl. No. 16/984,014 mailed Jan. 3, 2022, pp. 1-31.
Office Communication for U.S. Appl. No. 16/586,554 mailed Feb. 24, 2022, pp. 1-47.
Office Communication for U.S. Appl. No. 16/984,014 mailed Mar. 18, 2022, pp. 1-5.
Office Communication for U.S. Appl. No. 16/944,043 mailed Apr. 19, 2022, pp. 1-10.
Office Communication for U.S. Appl. No. 16/984,014 mailed Apr. 20, 2022, pp. 1-33.
Office Communication for U.S. Appl. No. 17/091,536 mailed Apr. 25, 2022, pp. 1-32.
Office Communication for U.S. Appl. No. 17/091,536 mailed Jul. 7, 2022, pp. 1-5.
Office Communication for U.S. Appl. No. 17/091,536 mailed Aug. 16, 2022, pp. 1-38.
Office Communication for U.S. Appl. No. 16/586,554 mailed Aug. 17, 2022, pp. 1-56.
Office Communication for U.S. Appl. No. 17/370,367 mailed Sep. 1, 2022, pp. 1-13.
International Search Report and Written Opinion for International Patent Application No. PCT/US2022/034283 mailed Oct. 27, 2022, pp. 1-12.
Office Communication for U.S. Appl. No. 16/586,554 mailed Nov. 21, 2022, pp. 1-6.
Office Communication for U.S. Appl. No. 16/586,554 mailed Jan. 5, 2023, pp. 1-24.

(56) References Cited

OTHER PUBLICATIONS

Office Communication for U.S. Appl. No. 17/370,367 mailed Jan. 27, 2023, pp. 1-14.
Office Communication for U.S. Appl. No. 17/409,299 mailed Feb. 14, 2023, pp. 1-28.
Office Communication for U.S. Appl. No. 17/542,148 mailed Feb. 17, 2023, pp. 1-8.
Office Communication for U.S. Appl. No. 17/535,465 mailed Jun. 8, 2023, pp. 1-7.
Office Communication for U.S. Appl. No. 17/409,299 mailed Jun. 28, 2023, pp. 1-36.
Office Communication for U.S. Appl. No. 17/091,536 mailed Jul. 24, 2023, pp. 1-7.
Office Communication for U.S. Appl. No. 17/542,148 mailed Feb. 28, 2023, pp. 1-2.
Office Communication for U.S. Appl. No. 17/091,536 mailed Mar. 10, 2023, pp. 1-10.
Office Communication for U.S. Appl. No. 17/091,536 mailed Mar. 16, 2023, pp. 1-3.
Office Communication for U.S. Appl. No. 17/370,367 mailed Apr. 6, 2023, pp. 1-4.
Office Communication for U.S. Appl. No. 17/370,367 mailed May 24, 2023, pp. 1-18.
Pienta, Robert et al., "Visage: Interactive Visual Graph Querying," AVI '16, Jun. 7-10, 2016, Bari Italy, pp. 272-279.
Von Landesberger, Tatiana et al., "A System for Interactive Visual Analysis of Large Graphs Using Motifs in Graph Editing and Aggregation," VMV 2009, pp. 1-9.
Papenbrock, Thorsten et al., "Data-driven Schema Normalization," in Proceedings of the 20th International Conference on Extending Database Technology, 2017, pp. 342-353.
Brunel, Robert et al., "Supporting Hierarchical Data in SAP HANA," 2015 IEEE 31st International Conference on Data Engineering (ICDE), 2015, pp. 1-12.
Furmanova, Katarina et al., "Taggle: Scalable Visualization of Tabular Data through Aggregation," IEEE Transactions on Visualization and Computer Graphics, 2017, pp. 1-14.
Office Communication for U.S. Appl. No. 17/091,536 mailed Apr. 25, 2022, pp. 1-32.
Gillis, Alexander S. et al., "What is integrated development environment (IDE)?—Definition from Whatis.com," Sep. 2018, TechTarget, https://www.techtarget.com/searchsoftwarequality/definition/integrated-development-environment, Accessed: Aug. 16, 2022, pp. 1-4.
Office Communication for U.S. Appl. No. 16/586,554 mailed Nov. 21, 2022, pp. 1-6.
Bauer, Reinhard et al., "The Shortcut Problem—Complexity and Algorithms," Journal of Graph Algorithms and Applications, Aug. 2012, vol. 16, No. 2, pp. 447-481.
Hesse, William, "Directed Graphs Requiring Large Nos. of Shortcuts," in Proceedings of the Fourteenth Annual ACM-SIAM Symposium on Discrete Algorithms, Jan. 2003, pp. 665-669.
International Search Report and Written Opinion for International Patent Application No. PCT/US2022/031195 mailed Aug. 31, 2022, pp. 1-12.
Office Communication for U.S. Appl. No. 17/542,148 mailed Oct. 27, 2022, pp. 1-14.
International Search Report and Written Opinion for International Patent Application No. PCT/US2022/038328 mailed Nov. 30, 2022, pp. 1-12.
International Search Report and Written Opinion for International Patent Application No. PCT/US2020/028163 mailed Jul. 21, 2020, pp. 1-7.
Office Communication for U.S. Appl. No. 16/389,389 mailed May 13, 2021, pp. 1-16.
Office Communication for U.S. Appl. No. 16/389,389 mailed Aug. 18, 2021, pp. 1-9.

* cited by examiner

PROVIDING DATA FLOW DIRECTIONS FOR DATA OBJECTS

CROSS-REFERENCE TO RELATED APPLICATION

This application is a Utility Patent application based on previously filed U.S. Provisional Patent Application No. 63/239,282 filed on Aug. 31, 2021, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively, to managing the data associated with objects included in visualizations.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. Accordingly, in some cases, organizations may employ various applications or tools to generate visualizations based on some or all of their data. Employing visualizations to represent data may enable organizations to improve their understanding of business operations, sales, customer information, employee information, key performance indicators, or the like. In some cases, sophisticated visualizations may incorporate or otherwise depend on data from a variety of sources within an organization, including different databases. In some cases, many different visualizations may depend on these varied or disparate data sources. Often it may be important to enable to users to identify relationships between different dependent objects that may be used for interacting with those objects. Some relationships between objects may be associated with data flow while other objects may be associated with other types of relationships such as attributes objects. In some cases, manual determination of relationships between some different data types may be prone to error because of the many varied or disparate data types or disparate relationship types that may be present. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
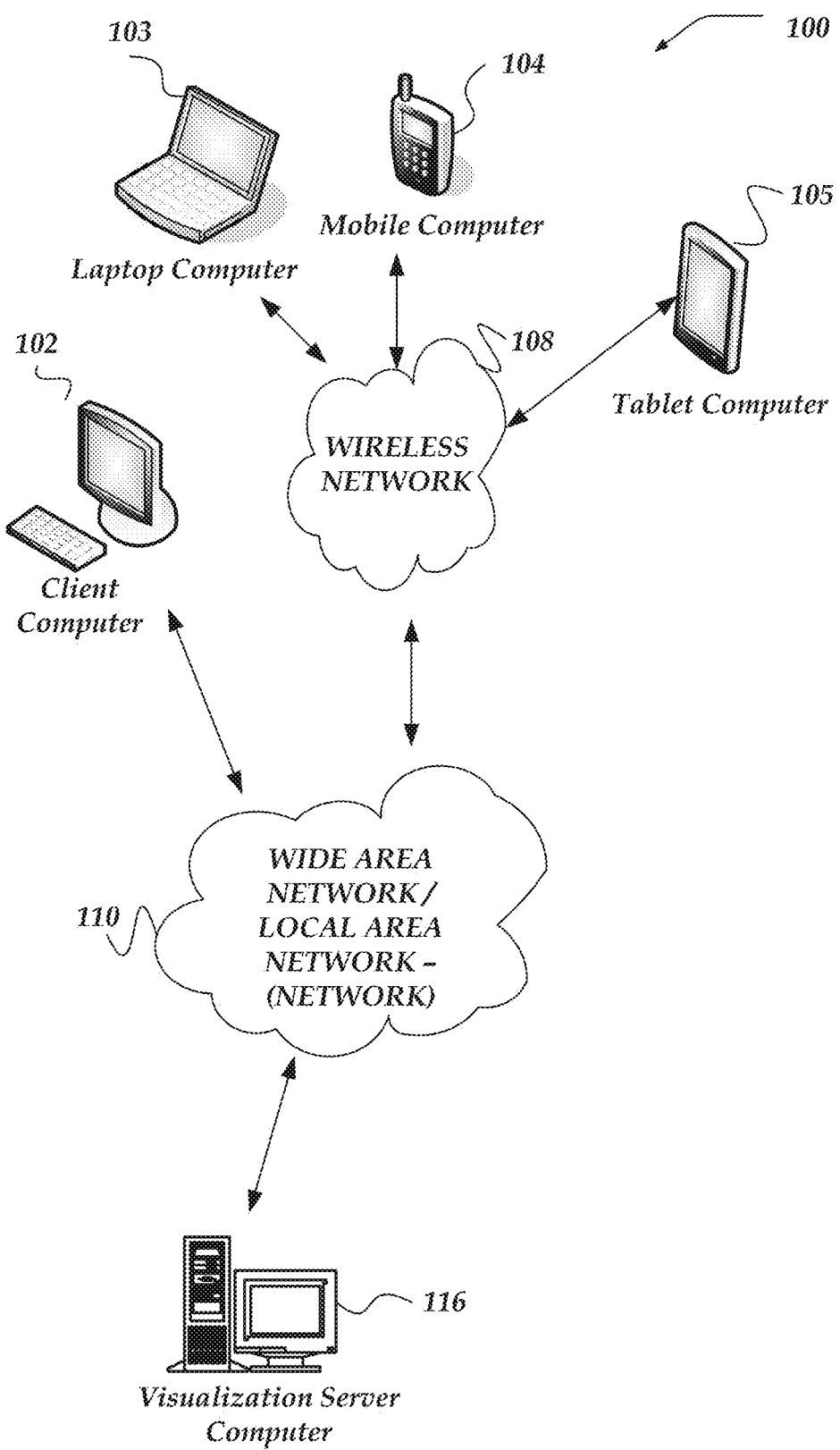
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein, the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein, the term "data object" refers to one or more entities or data structures that comprise data models. In some cases, data objects may be considered portions of the data model. Data objects may represent classes or kinds of items, such as, databases, data-sources, tables, workbooks, visualizations, work-flows, or the like.

As used herein, the term "data object class" or "object class" refers to a one or more entities or data structures that represent a class, kind, or type of data objects.

As used herein, the term "data type" refers a data object that represents a class or kind of data objects. For example, Table and Column may each be data types while Table A and Column B of Table A may be considered instances of data type Table and data type Column respectively.

As used herein, the term "schema model" refers to data structures the represent the various data types and relationships between those data types. Schema models may be considered data models that define data types, data type relationships, and so on.

As used herein, the term "schema content" refers to information provided by data providers or other users that may describe data types, data type relationships, hierarchy relationships, or the like, that may be employed by lineage engine to generate data models or portions of data models.

As used herein, the term "graphlet" refers to data structures that represent a graph-like portion of a data model. Data providers may provide schema content that declares one or more graphlets that may be included in a new or existing data model.

As used herein, the term "shortcut" refers to directed path in a schema model that extends from a source data type node to a target data type node. Shortcuts may be separate or different from other relationships between data types or data objects. For example, a shortcut may define a shortcut edge that directly connects two data types that otherwise are not directly connected by other relationships.

As used herein, the term "display model" refers to one or more data structures that represent one or more representations of a data model that may be suitable for use in a visualization that is displayed on one or more hardware displays. Display models may define styling or user interface features that may be made available to non-authoring user.

As used herein, the term "display object" refers to one or more data structures that comprise display models. In some cases, display objects may be considered portions of the display model. Display objects may represent individual instances of items or entire classes or kinds of items that may be displayed in a visualization. In some embodiments, display objects may be considered or referred to as views because they provide a view of some portion of the data model.

As used herein, the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using a network computer. In one or more of the various embodiments, a data model that includes one or more data types and one or more data type relationships may be provided such that each data type may be represented by a node in the data model and each data type relationship may be represented by an edge in the data model.

In one or more of the various embodiments, a graphlet that includes one or more other data types and one or more other data type relationships that are absent from the data model may be provided such that the one or more other data types may be included as one or more nodes in the data model and the one or more other data type relationships may be included as one or more edges in the data model.

In one or more of the various embodiments, one or more shortcut nodes in the data model may be determined based on the graphlet.

In one or more of the various embodiments, in response to determining a first portion of the one or more nodes in the data model downstream of one or more leaf nodes in the graphlet, further actions may be performed, including: traversing the data model to visit the one or more downstream nodes; generating one or more shortcut edges to each downstream node associated with the one or more shortcut nodes.

In one or more of the various embodiments, in response to determining a second portion of the one or more nodes in the data model upstream of the one or more leaf nodes, further actions may be performed, including: traversing the data model upwards from the one or more leaf nodes; generating one or more other shortcut edges to each node visited in the upwards traversal that is associated with the one or more shortcut nodes.

In one or more of the various embodiments, in response to a query that includes a source data type and a target data type, the one or more shortcut edges or the one or more other shortcut edges may be employed to provide a path in the data model from the source data type to the target data type.

In one or more of the various embodiments, one or more leaf nodes in the graphlet may be determined based on each leaf node being associated with a first edge to another node in the graphlet and a second edge to a leaf node outside of the graphlet.

In one or more of the various embodiments, including the one or more other data types and the one or more other data type relationships, may include: determining a direction of the one or more edges that associate the one or more other data types with the data model based on a hierarchy indicator included in schema content that corresponds to the graphlet such that the hierarchy indicator declares one or more parent-child relationships between one or more of the one or more data types or the one or more other data types.

In one or more of the various embodiments, schema content that declares one or more hierarchy indicators for one or more of the other data type relationships may be provided such that the one or more hierarchy indicators include, parent, child, above, below, or attribute. In some embodiments, the direction of the one or more other edges may be determined based on the one or more hierarchy indicators that include parent or child such that each other edge associated with a parent hierarchy indicator that runs from a parent node to a child node such that each other edge associated with an above hierarchy indicator runs in the downstream direction of the data model and each other edge associated with a below hierarchy indicator runs in the upstream direction of the data model.

In one or more of the various embodiments, determining the one or more shortcut nodes in the data model based on the graphlet may include, providing schema content that declares the one or more other data types and the one or more other data type relationships such that the schema content declares one or more of the one other data types to correspond to shortcut nodes in the data model.

In one or more of the various embodiments, providing the data model may include: providing one or more compound data types that may be comprised of two or more data types. And, in some embodiments, providing more than one node in the data model that may represent a same data type.

In one or more of the various embodiments, one or more delete nodes from the data model may be determined to remove from the data model. In some embodiments, each shortcut edge that may be exclusively associated with the one or more delete nodes from the data model may be removed.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like.

However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
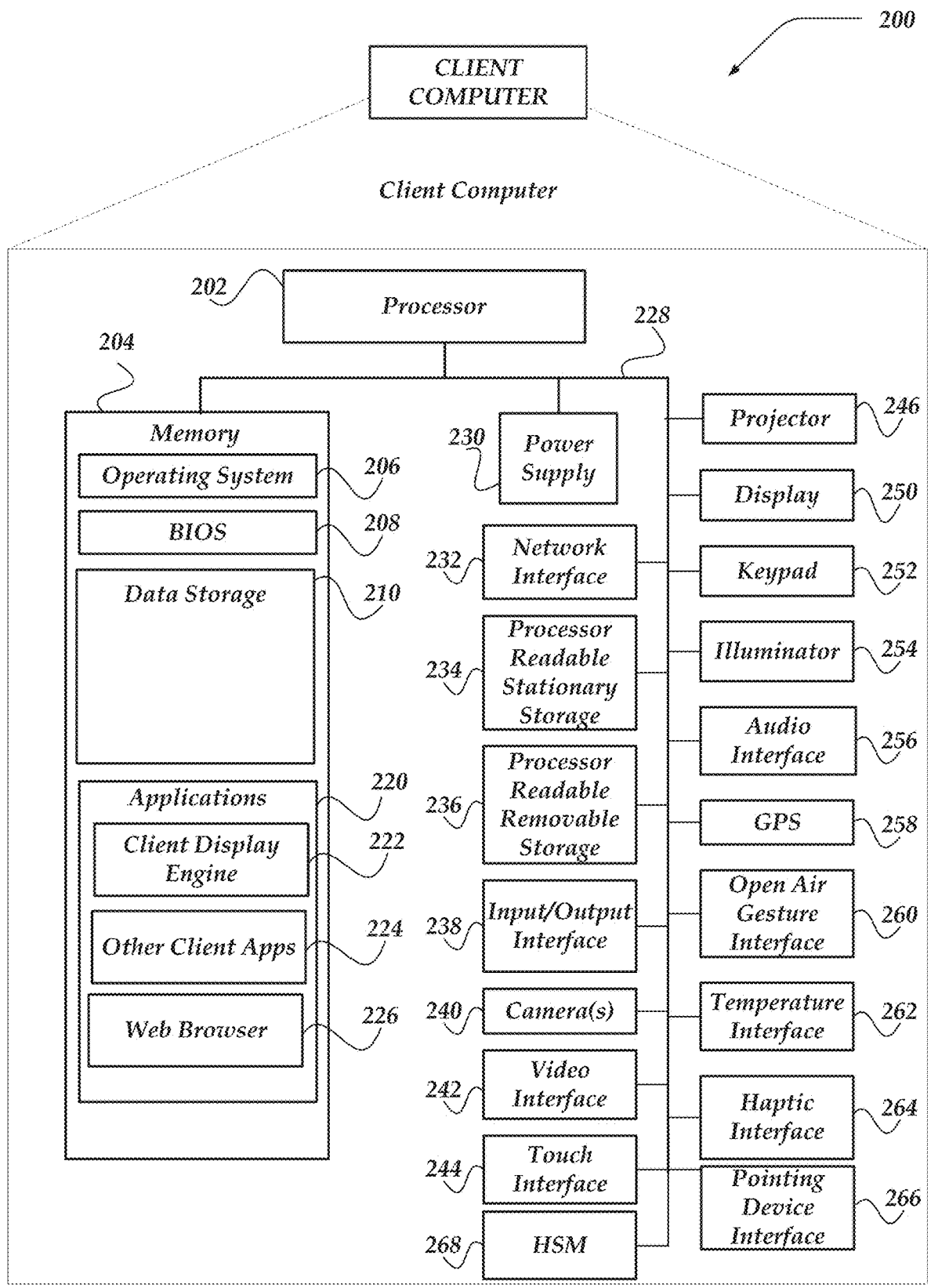
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, Microsoft Windows® or a specialized client computer communication operating system such as, Android™, or the Apple® Corporation's iOS. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
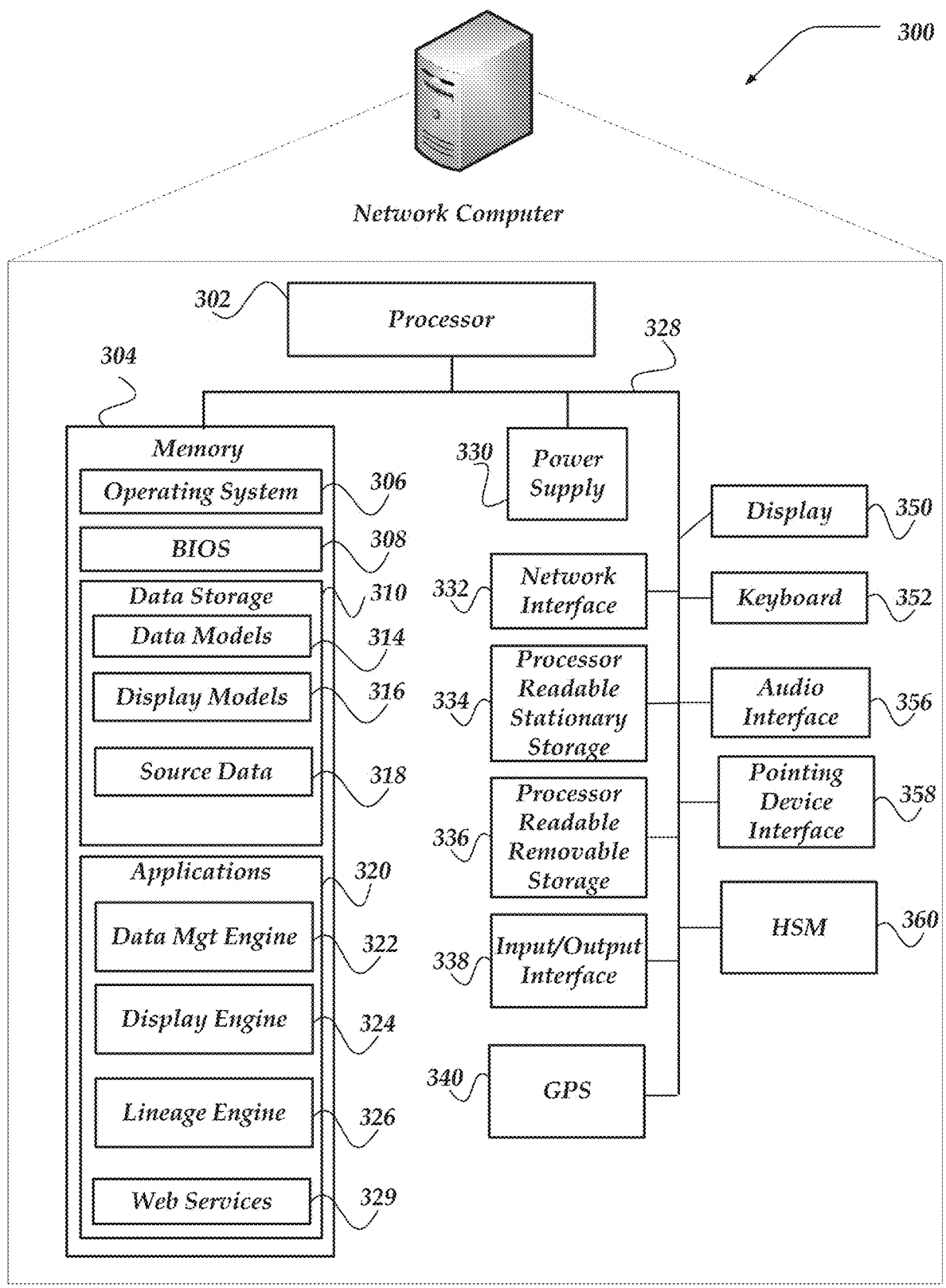
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, data management engine 322, display engine 324, lineage engine 326, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, source data 318, or the like. Data models 314 may store files, documents, versions, properties, meta-data, data structures, or the like, that represent one or more portions of one or more data models. Display models 316 may store display models. Source Data 318 may represent memory used for storing databases, or other data sources that contribute the data that underlies the data models, display models, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include data management engine 322, display engine 324, lineage engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, data management engine 322, display engine 324, lineage engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to data management engine 322, display engine 324, web services 329, or the like, may be provisioned and de-commissioned automatically.

Also, in one or more of the various embodiments, data management engine 322, display engine 324, lineage engine 326, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
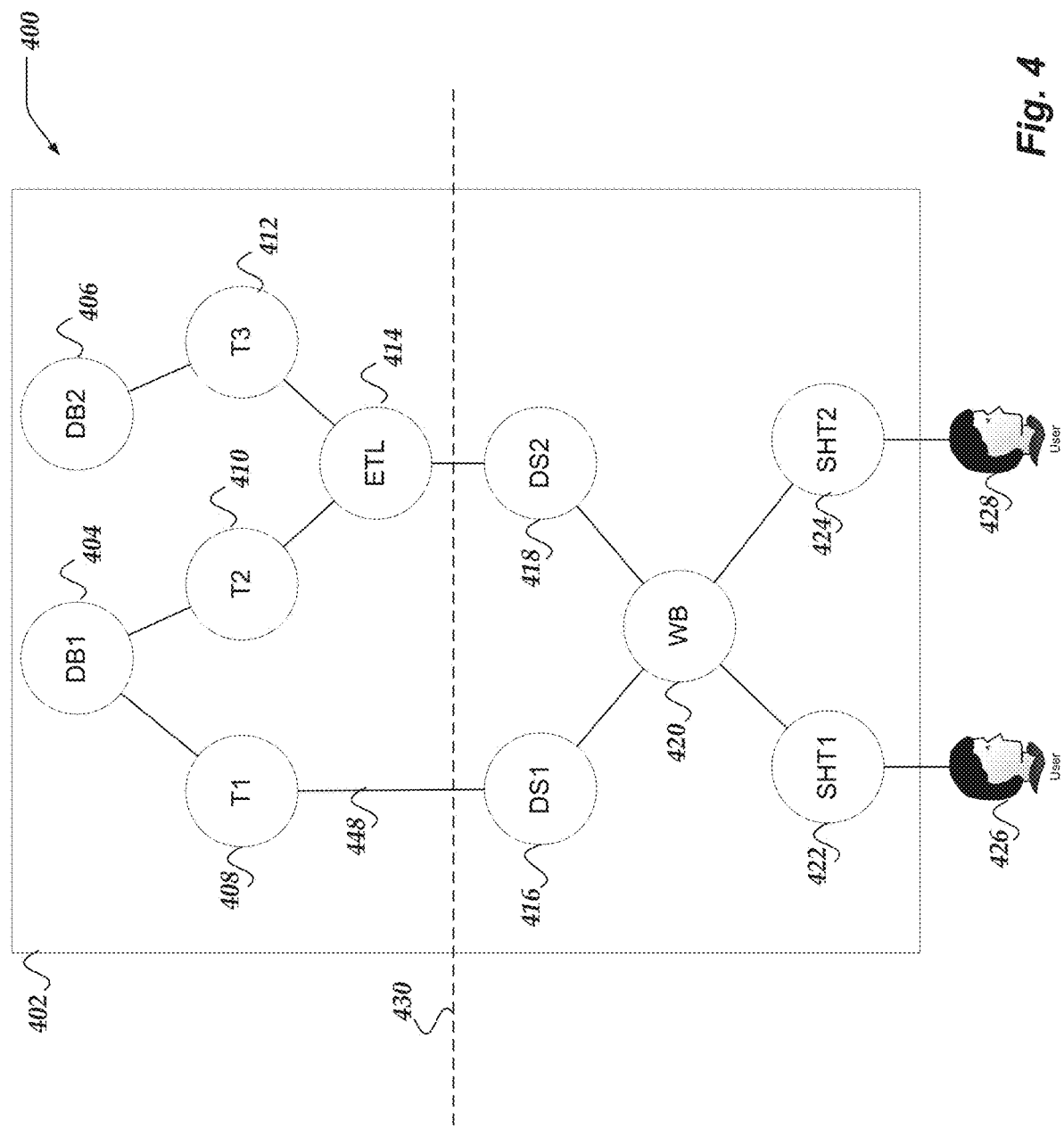
FIG. 4 illustrates a logical architecture of a system for providing data flow directions for data objects in accordance with one or more of the various embodiments.

FIG. 4 illustrates a logical architecture of system 400 for providing data flow directions for data objects in accordance with one or more of the various embodiments. In one or more of the various embodiments, system 400 may include various components, such as, data model 402, which may be comprised of various data objects ranging from one or more databases objects to one or more visualizations. In this example, data model 402 includes database object 404, database object 406, table object 408, table object 410, table object 412, workflow object 414, data source object 416, data source object 418, workbook object 420, sheet object 422, and sheet object 424. Note, for brevity and clarity, data model 402 is represented using the data objects listed. However, one of ordinary skill art will appreciate that data models may include more or fewer data objects or more or fewer data object types than shown here without departing from the scope of the innovations described herein.

In one or more of the various embodiments, visualization server computers, such as, visualization server computer 116 may be arranged to employ data models, such as, data model 402 to represent information that may be used for generating visualizations. Also, in some embodiments, data models may be used to manage other actors in a visualization system, including, users, authors, or the like.

In this example, data model 402 may have one or more root level data objects, such as, data object 404 and data object 406. Data object 404 and data object 406 represent databases that may be a source of information that drives the data model. For example, data object 404 may represent a SQL RDBMS associated with one part of an organization while data object 406 may represent an API gateway to another information provider or other databases.

In one or more of the various embodiments, data object 408, data object 410, data object 412, or the like, represent tables or table-like objects that may be provided by one or more databases. At this level of the data model, the data objects may be considered to closely model the entities provided from the databases. Accordingly, in some embodiments, properties or attributes of tables or database objects may closely mirror their native representations including attribute names, data types, table names, column names, or the like. For example, data administrators may be enabled to "import" databases or tables into a data model such that the imported objects retain some or all of the features or attributes that are available in native form. In some cases, in some embodiments, one or more imported data objects may include metadata information that may be imported as well.

In one or more of the various embodiments, before an imported table object may be used for visualizations, data administrators may have to perform or execute one or more actions to the prepare the information for consumption by visualizations or visualization authors. In this example, extract-transform-load (ETL) object 414 represents an ETL process that does some processing on information in table object 410 and table object 412 before it is made available for use in visualizations.

In one or more of the various embodiments, data source objects, such as, data source 416 or data source 418 represent data objects that may be available for visualization authors to incorporate into visualizations or other display models. In some embodiments, data source objects may provide data administrators control to manage or otherwise shape the information from databases (e.g., database 404 or database 406) that may be made available to visualizations or visualization authors. For example, one or more tables in database 404 may include sensitive information that an organization want to exclude from visualizations. Accordingly, in some embodiments, by selecting mapping attributes from table objects to data source objects, data administrators may control how data is exposed from the underlying databases. In some embodiments, data administrators may be enabled select particular columns or attributes from table objects to include in data sources. Also, in some embodiments, attribute names in table objects may be mapped to different names in data sources. For example, a table column named customer identifier in a table object may be mapped to an attributed named 'Account Number' in the data source. Further, in some embodiments, other transformations of mappings may be performed, such as, data type conversions, aggregations, filtering, combining, or the like. In some embodiments, extensive or complex transformations may be encapsulated in ETL objects, or the like, whereas simpler or more common transformations may be enabled without using a separate ETL object.

In one or more of the various embodiments, edge 448 represents a mapping from a table object to a data source. In this example, edge 448 may represent the one or more data structures that map one or more attributes (e.g., columns) of table object 408 to data source 416. Accordingly, in some embodiments, edge 448 provides or is associated one or more mapping rules or instructions that define which information from table object 408 is available in data source 416, as well as, how the information from table object 408 may appear to visualization authors.

In one or more of the various embodiments, workbook object 420 represents a data object that may be associated with one or more user level data objects, such as, sheet object 422 or sheet object 424. In some embodiments, visualization authors may be enabled to design workbooks, such as, workbook object 420, based on information provided by one or more data sources, such as, data source 416 or data source 418. In some embodiments, visualization authors may design workbooks that include one or more sheets (e.g., sheet object 422 or sheet object 424. In some embodiments, sheet objects may include one or more visualizations, or the like.

In one or more of the various embodiments, sheet object 422 or sheet object 424 may represent some or all of the information that may be provided to a visualization engine, or the like, that provide one or more interactive visualization applications or reports that may be employed by users. In this example, sheet object 422 or sheet object 424 may be considered to include or reference one or more of data, meta-data, data structures, or the like, that may be used to render one or more visualizations of information that may be provided by one or more databases. In some embodiments, sheets may be arranged to include one or more display models, styling information, text descriptions, narrative information, stylized graphics, links to other sheets, or the like.

In one or more of the various embodiments, data management engines or lineage engines may be arranged to receive schema content from various data providers. Accordingly, lineage engines may be arranged to interpret the provided schema content to add data types, reference relationships, and data flow relationships to the data model. In some cases, this may include creating one or more relationships between those data types and other data types that may be contributed by various other data providers.

In one or more of the various embodiments, schema content may be provided in a graphlet format that declares one or more data type nodes and relationships between the one or more data types. In some embodiments, relationships may be represented as graph edges in the data model that may define the connection between a data type node in the graphlet to another data type node which could be internal to the graphlet or external of the graphlet. In some embodiments, the data providers may be enabled to define the schema content using various conventional or customized notational methods, including employing GraphQL-like notations that define node types, node attributes, node relationships to other nodes, node permission characteristics, or the like.

In some embodiments, inconsistency or ambiguities in the meaning of relationships in provided schema content may make automatic traversal of data models in the direction of data flow difficult or even impossible. Accordingly, in some embodiments, data providers may be required to explicitly define data flow paths that represent how data flows with the data model. In some cases, it may be common for the shortcut path definitions to become disadvantageously complex if there may be a mix of data sources involved. Relying on manual definition of traversal paths may lead to a steep learning curve, possibility for missed paths and potential for correctness issues. Also, in some cases, manual paths may result in inefficient traversal while determining shortcuts.

Accordingly, in some embodiments, lineage engines may be arranged to interpret schema content to determine one or more edges that may be indicated as representing parent/child relationships. Thus, in some embodiments, parent nodes and child nodes may be automatically determined based on specialized indicators included in schema content.

Also, in some cases, for some embodiments, lineage engines may be arranged to enable data providers to declare that a data type may be above or below other data types. Thus, data flow direction may be inferred absent a direct parent/child relationship. Herein, a data type may be considered above another data type if it occurs closer to a root of data model. With respect to data flow direction, if a first data type may be above second data type, the data may be considered to flow from the first the data type to the second type.

Figure 5A:
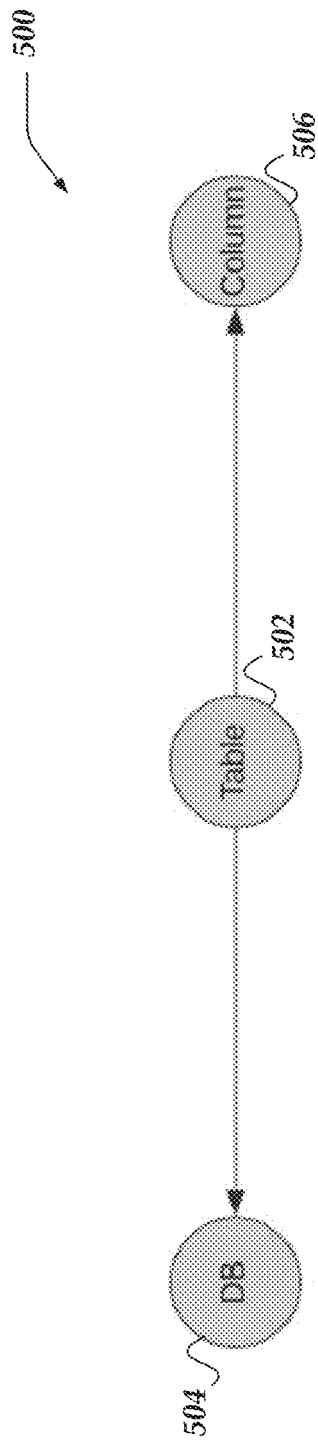
FIG. 5A illustrates a logical representation of a schema portion for providing data flow directions for data objects in accordance with one or more of the various embodiments.

FIG. 5A illustrates a logical representation of schema portion 500 for providing data flow directions for data objects in accordance with one or more of the various embodiments. In some embodiments, data providers may designate one or more portions of a schema from an external data source to include in a data model. In some cases, schema information provided from external data sources may include or define one or more relationships between data types represented in the external data source. In some cases, for some embodiments, relationships in the external data sources may not represent data flow information required for data models. For example, in some cases, schema information provided by data providers (data sources, databases, or the like) may represent data type relationships rather than data flow relationships.

In this example, schema portion 500 includes, table node 502, column database node 504, and column node 506. In this example, the data source associated with schema portion 500 may be considered 'table-centric' in the sense that data administrators may focus on creating tables to represent various data types in a system. In some cases, data administrators (and their tools) may be focused on static relationships that may define the data types of interest rather than being directed to how data flows in the system.

Figure 5B:
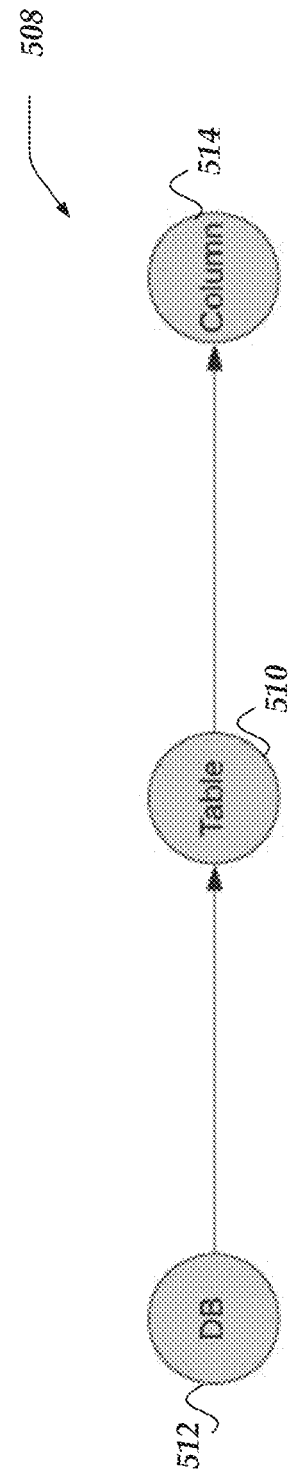
FIG. 5B illustrates a logical representation of a data model portion for providing data flow directions for data objects in accordance with one or more of the various embodiments.

FIG. 5B illustrates a logical representation of data model portion 508 for providing data flow directions for data objects in accordance with one or more of the various embodiments. In this example, data model portion 508 includes table node 510, database node 512, and column node 514.

In some embodiments, lineage engines may be arranged to generate data models based on schema content provided by various data providers. Accordingly, in some embodiments, lineage engines may be arranged to parse the schema content to determine the data flow relationships of the data objects represented by the portion of the schema provided in the scheme content.

In this example, for some embodiments, data model portion 508 illustrates that data flows from database node 512 to table node 510 and then to column node 514. While this example may seem intuitive, alternative data flows may be defined depending on the data model and its underlying data.

Accordingly, in some embodiments, lineage engines may be arranged to enable data providers to include hierarchy information related to data flow. In some embodiments, lineage engines may be arranged to interpret the hierarchy information in view of the overall data model to determine data flow relationships.

In some embodiments, if data flow relationships may be determined, lineage engines may be arranged to generate data flow paths that may be employed as shortcuts to traverse data models to identify sources or destinations of data.

Figure 6:
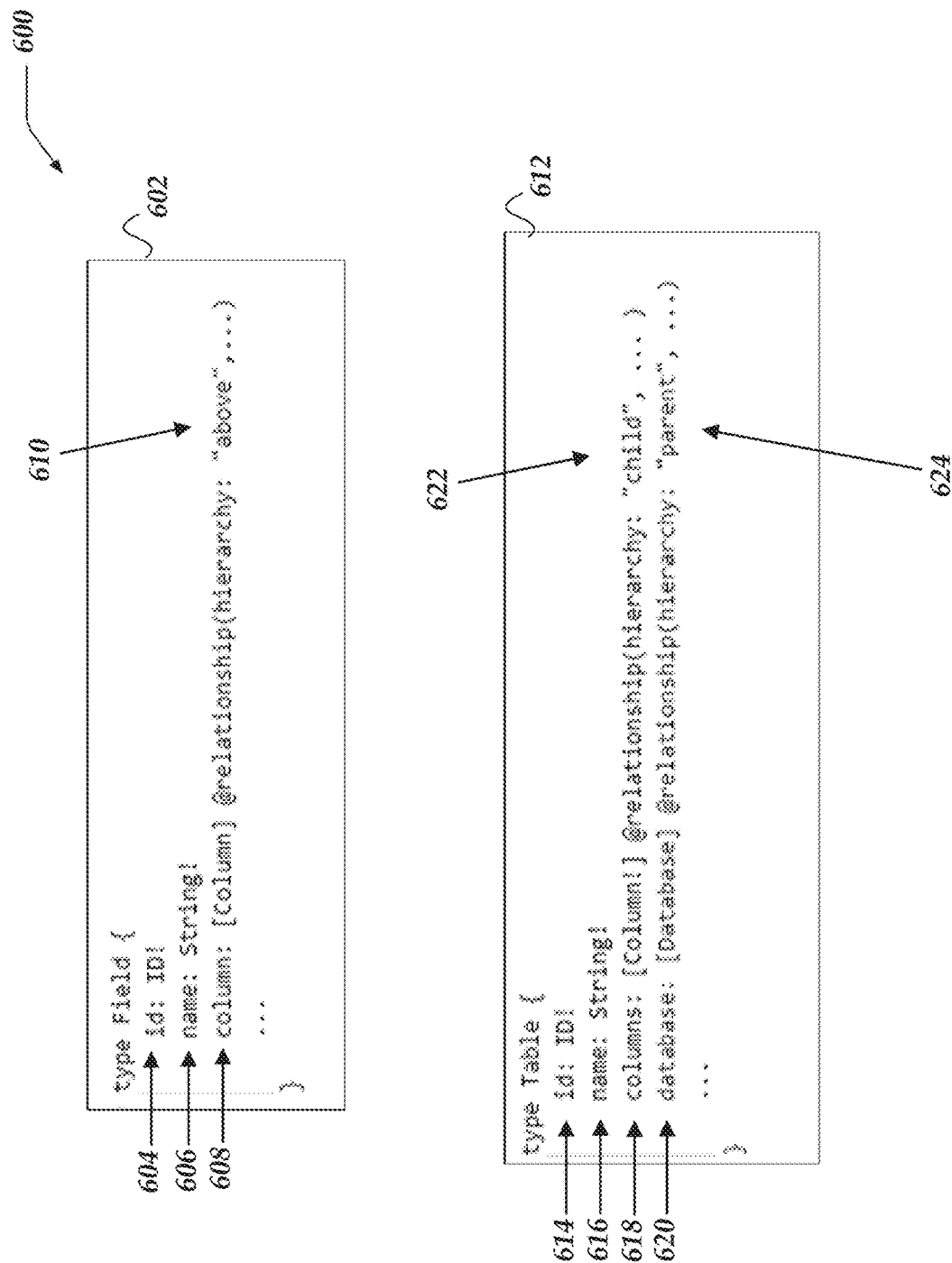
FIG. 6 illustrates non-limiting representation of schema content for providing data flow directions for data objects in accordance with one or more of the various embodiments.

FIG. 6 illustrates non-limiting representations of schema content 600 for providing data flow directions for data objects in accordance with one or more of the various embodiments. As described above, data providers (or other users) may provide schema content that declares one or more data types or data type relationships. In some embodiments, schema content may include information that enables lineage engines to integrate the data types declared in the schema content into a data model.

In this example, for some embodiments, schema content for data type 602 and data type 606 is shown using a JSON-like syntax that informally conforms to GraphQL. Accordingly, in some embodiments, schema content that declares data types may include various information, such as, data type name, one or more attributes, on references to other data types, or the like. Further, in some embodiments, while not shown here, various other information, such as, owner information, security information, meta-data fields, categorization information, or the like.

One of ordinary skill in the art will appreciate that while JSON-like notation may enable efficient notation of schema content, the innovations described herein are not limited to providing/receiving schema content declared using JSON-like notation. Accordingly, in some embodiments, schema content may be provided using other notations or formats, such as, XML, Binary JSON (BSON), Yet Another Markup Language (YAML), exported database content, or the like, without departing from the scope of these innovations.

In this example, data type 602 represents a portion of schema content that declares a 'Field' data type. In this example, data type 602 includes identifier attribute 604, name label attribute 606, and relationship attribute 608. In this example, relationship 608 represent that data type 602 has a relationship named 'column' that references a Column data type. Further, relationship attribute 608 includes property 610 indicating that Column data type is considered to be 'above' data type 602. In this example, the 'above' property indicates that Fields are considered to be 'below' Columns with respect to data flow in the data model. Thus, in this example, data flows from Columns to Fields.

Similar to data type 602, data type 612 includes identifier attribute 614, name label attribute 616, relationship attribute 618, and relationship attribute 620. Further, in this example, relationship attribute 618 includes property 622 indicating that Column data types are considered children of Tables. Likewise, in this example, relationship attribute 620 includes property 624 indicating that Database data types are considered parents of Tables.

Accordingly, as shown in these examples, including hierarchy information in schema content provides lineage engines information that may be employed to disambiguate data flow directions that may be ambiguous if the schema content was limited to conventional schema information.

Figure 7:
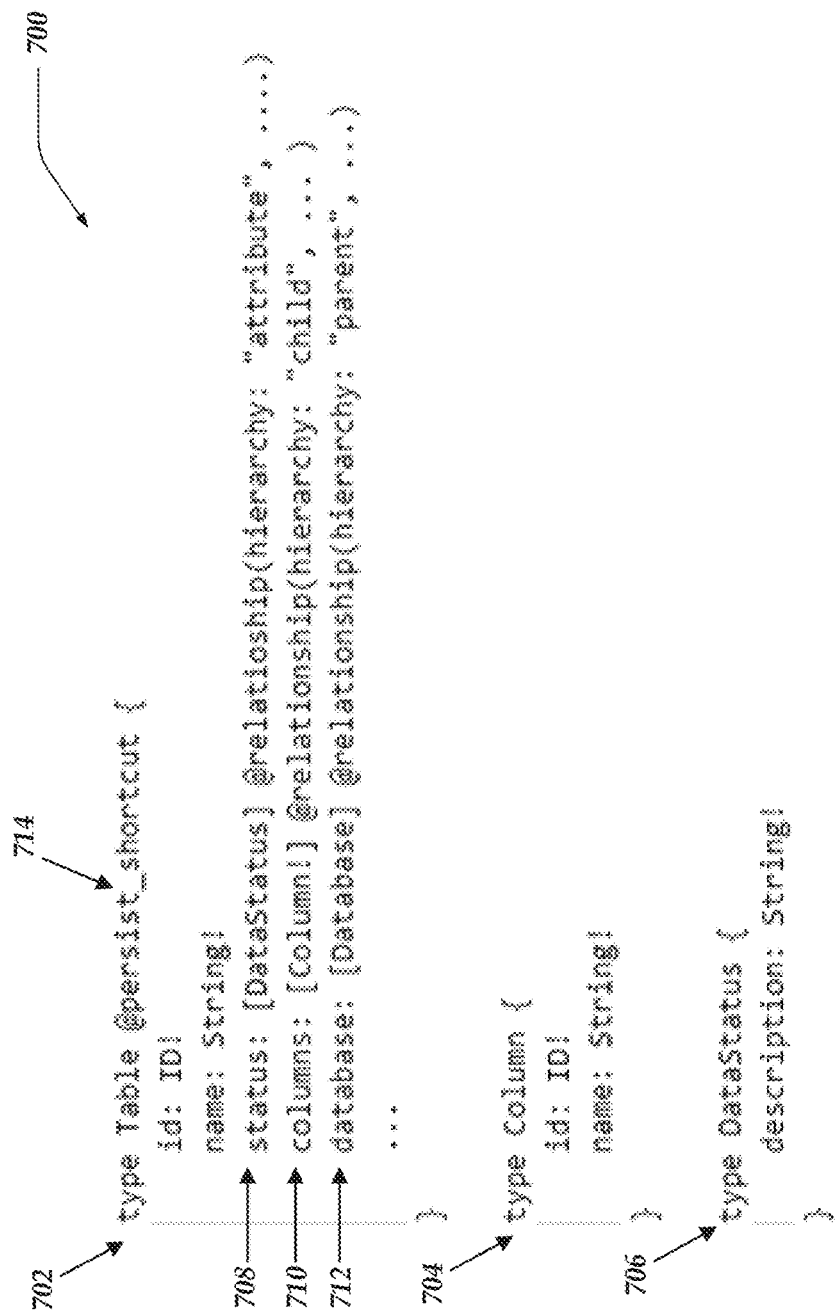
FIG. 7 illustrates non-limiting representation of schema content for providing data flow directions for data objects in accordance with one or more of the various embodiments.

FIG. 7 illustrates non-limiting representations of schema content 700 for providing data flow directions for data objects in accordance with one or more of the various embodiments. Similar to schema content 600 above, schema content 700 represents schema content that declares various data types for a data model. In this example, Table data type 702, Column data type 704, and DataStatus data type 706.

Accordingly, in some embodiments, data type 702 includes status relationship attribute 708, columns relationship attribute 710, database relationship attribute 712. In this example, for some embodiments, status relationship attribute 708 declares that there is relationship between Table data types and DataStatus data types. Further, in this example, relationship 708 declares that the related DataStatus may be considered an attribute of Table. In this example, it indicates to the lineage engines that DataStatus and Table may not have a data flow relationship because the attribute property indicates the DataStatus of a Table is an attribute of the Table that is not part of the data flow. In some cases, it may be considered administrative information not unlike meta-data rather than representing values relevant to data flow.

Also, in some embodiments, columns relationship 710 includes a property indicating the Column data types may be considered children of Tables. Accordingly, in this case, data may be declared to flow from Tables to Columns. Similarly, in this example, database relationship 712 indicates that Databases are considered parents of Tables. Thus, data may be considered to flow from Databases to Tables.

Further, in some embodiments, schema content may declare that one or more shortcuts to a data type should be persisted in the data model. In this example, decorator 714 indicates that shortcut information associated with Tables should be persisted.

Note, one of ordinary skill in the art will appreciate the schema content or data models may include more or fewer (unlikely) data types, relationships, or the like. However, one of ordinary skill in the art will appreciate that the schema content, data types, and relationships included here are at least sufficient for disclosing the innovations herein.

FIGS. 8A-8L illustrate how lineage engines may ingest schema content and generate shortcuts and data flow relationships for providing data flow directions for data objects in accordance with one or more of the various embodiments. Each figure illustrates a portion of the actions performed by lineage engines to provide data flow information and shortcuts for data objects.

In some embodiments, lineage engines may be arranged to execute actions that include ingesting data types and automatically traversing the data model to determine which shortcuts to generate and persist.

In some embodiments, production visualization platforms may employ data models that may have many more data types, data type relationships, shortcuts, or the like, than shown here. Accordingly, for brevity and clarity, these examples are illustrated using a reduced set of data types, and so on. However, one of ordinary skill in the art will appreciate that the examples shown for FIGS. 8A-8L are at least sufficient describing the innovations disclosed herein.

Further, the particular function or purpose of a given data type may be considered out of scope for this description of these innovations.

Figure 8A:
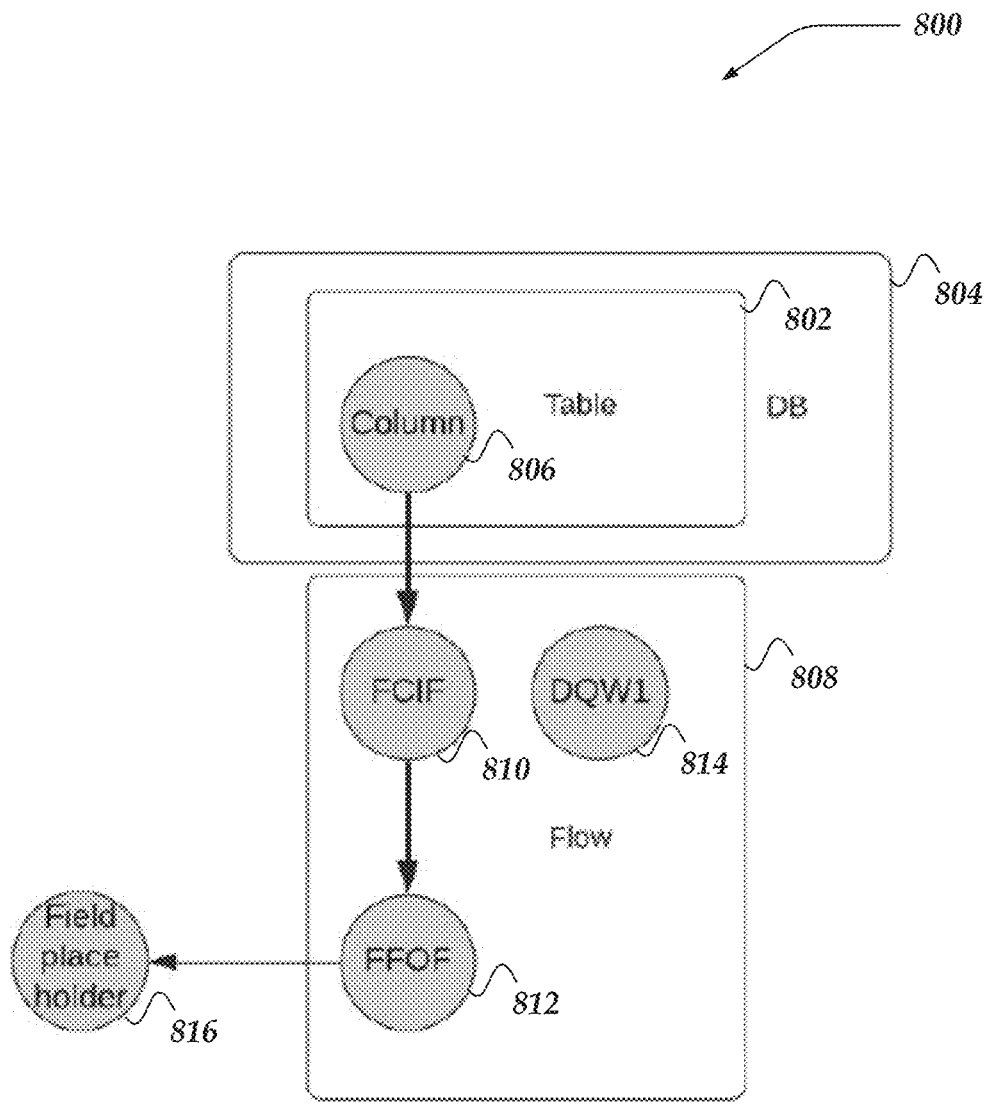
FIG. 8A illustrates a logical schematic of a data model for providing data flow directions for data objects in accordance with one or more of the various embodiments.

FIG. 8A illustrates a logical schematic of data model 800 for providing data flow directions for data objects in accordance with one or more of the various embodiments. FIG. 8A through FIG. 8L illustrate a sequence of operations that lineage engines may be arranged to execute to ingest schema content provided by data providers or other users.

In this example, for some embodiments, data model 800 may be considered to include Table data type 802, DB (database) data type 804, and Column data type 806. In this example, data types that may be considered 'containers data types' are illustrated using enclosing lines that represent a logical boundary of a container data type. Accordingly, data types represented as being withing a container boundary may be considered to be contained by the enclosing data type. Thus, in some embodiments, the enclosed data types may be children of the container type.

In this example, Table data type 802, DB (database) data type 804, and Column data type 806 may be considered to be schematic representations based on schema content such as schema content 700, or the like. However, in some embodiments, lineage engines may be arranged to parse the schema content to instantiate one or more data structures to realize a portion of a data model. Accordingly, in this example, Table data type 802, DB (database) data type 804, and Column data type 806 may be considered to be realized or otherwise instantiated versions of the data types declared in schema content 700.

Further, in this example, Flow data type 808 may be added to data model 800 by providing its corresponding schema content (not shown) to a lineage engine. Accordingly, in some embodiments, lineage engines may be arranged to instantiate Flow data type 808 based on the provided schema content. In this example, Flow data type 808 may be a container type that includes Input Flow data type 810, Output Flow data type 812, and DataStatus data type 814.

Figure 8B:
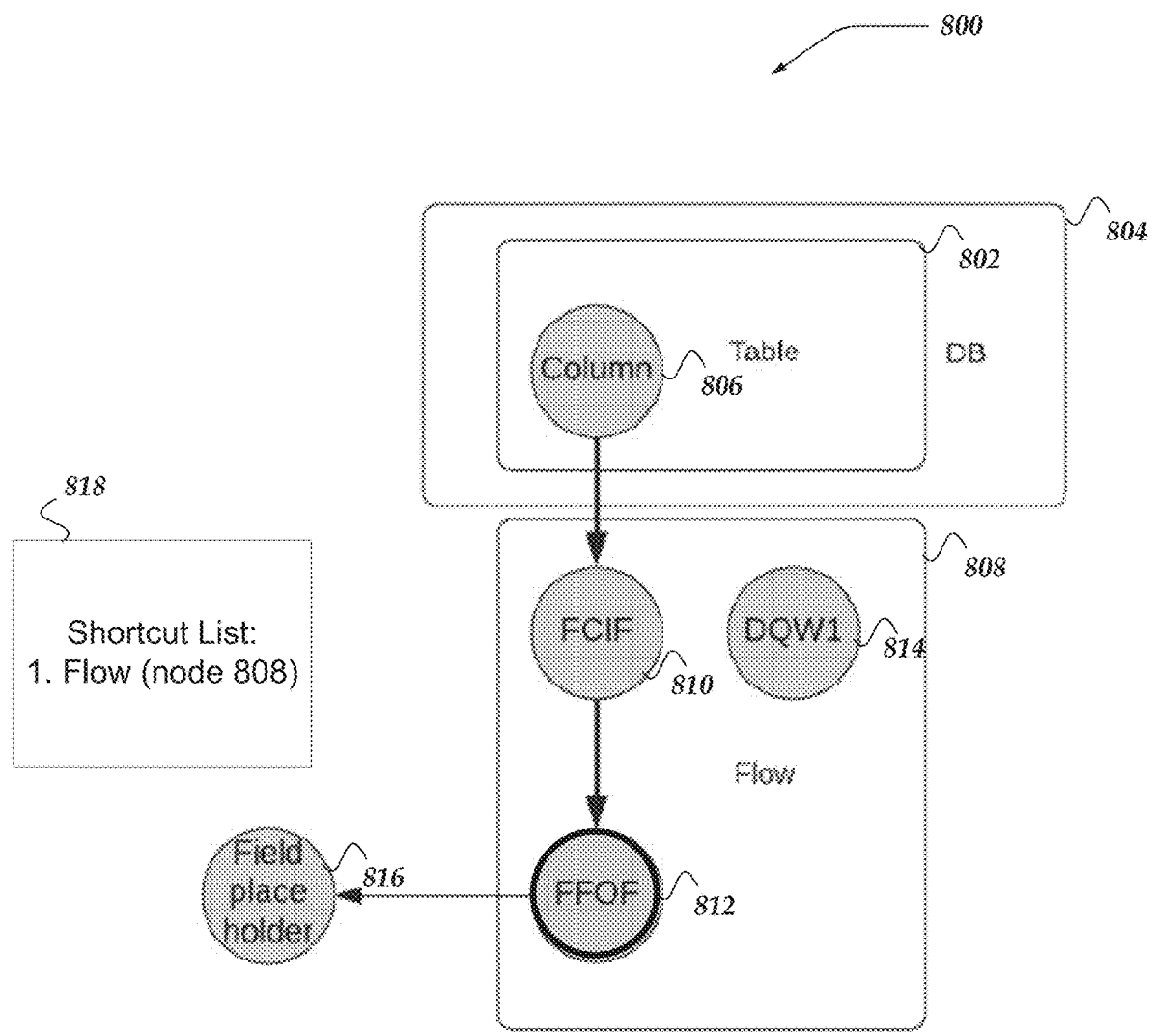
FIG. 8B illustrates a logical schematic of a data model for providing data flow directions for data objects in accordance with one or more of the various embodiments.

FIG. 8B illustrates a logical schematic of data model 800 for providing data flow directions for data objects in accordance with one or more of the various embodiments.

In some embodiments, lineage engines may be arranged to determine the bottom leaf nodes in the graphlet that includes Flow data type 808. As described above, lineage engines may be arranged to evaluate the data type nodes in ingested graphlets to determine bottom leaf nodes. In this example, data type node 812 may be considered a bottom leaf node because it is associated with an edge to another node in the graphlet and an edge to a node outside of the graphlet (node 816).

Note, in this example, the currently visited node (node 812) is indicated by the bolded border around the node.

Further, in this example, schema content that declares Flow data type 808 may be considered to be decorated with a persist shortcut decorator. Accordingly, in some embodiments, lineage engines may be arranged to add Flow data type 808 to a shortcut list, such as, shortcut list 818 so it may be processed later.

Figure 8C:
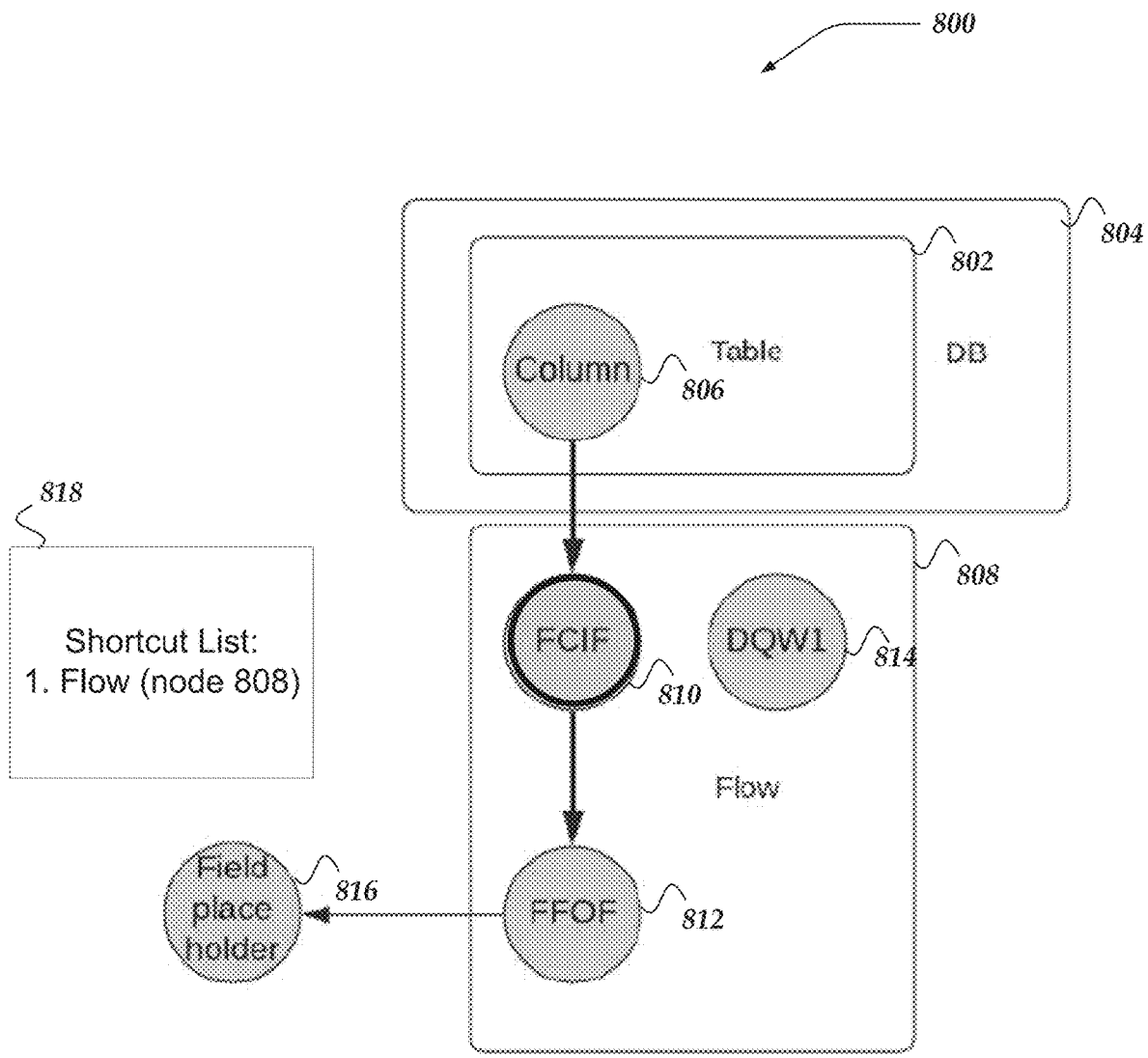
FIG. 8C illustrates a logical schematic of a data model for providing data flow directions for data objects in accordance with one or more of the various embodiments.

FIG. 8C illustrates a logical schematic of data model 800 for providing data flow directions for data objects in accordance with one or more of the various embodiments.

In this portion of the process, lineage engines may be arranged to traverse upwards from bottom leaf nodes. In this example, the Flow graphlet has one bottom leaf node (e.g., data type node 812). Accordingly, in some embodiments, lineage engines may be arranged to traverse upwards to data type node 810.

Figure 8D:
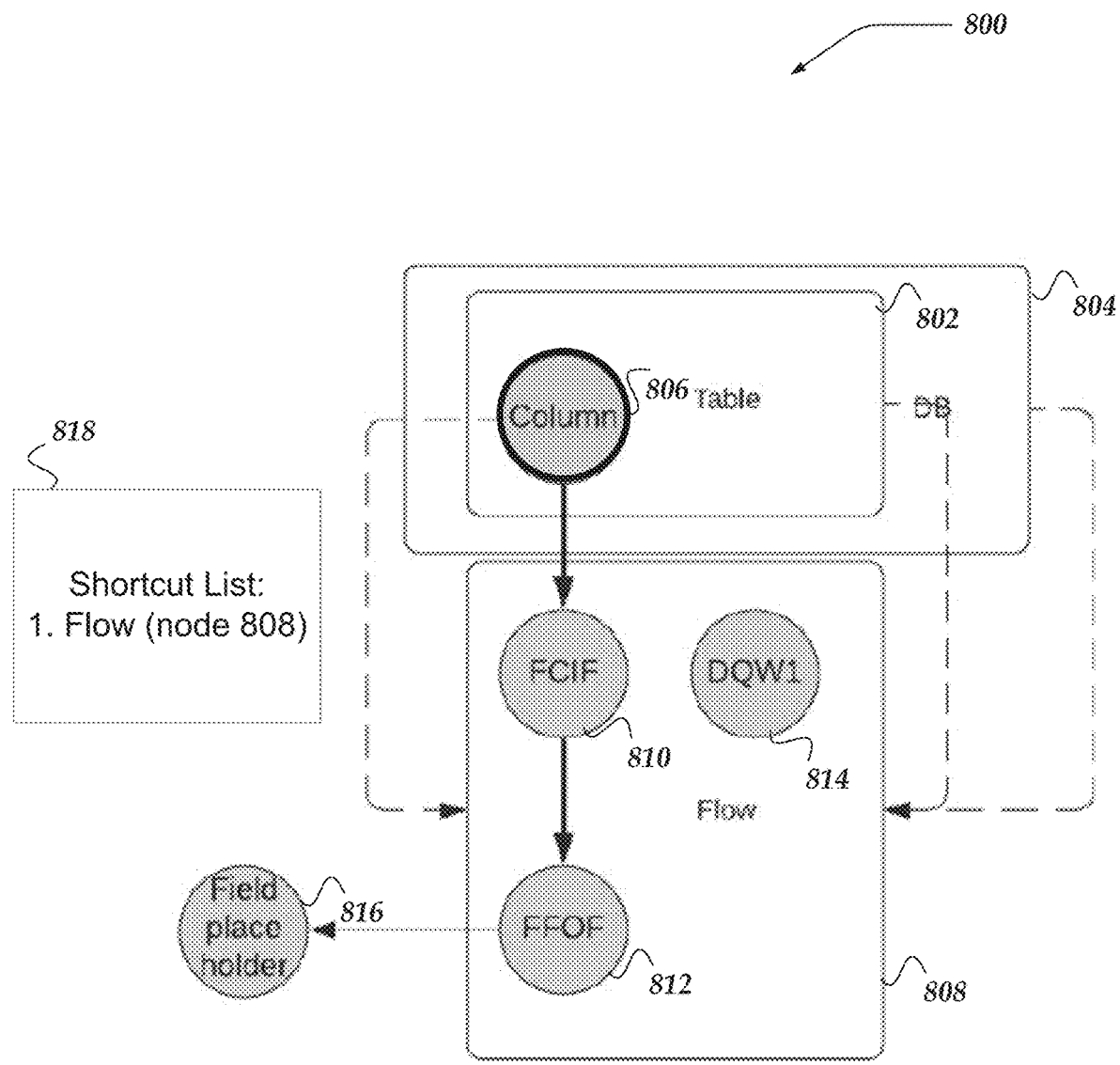
FIG. 8D illustrates a logical schematic of a data model for providing data flow directions for data objects in accordance with one or more of the various embodiments.

FIG. 8D illustrates a logical schematic of data model 800 for providing data flow directions for data objects in accordance with one or more of the various embodiments.

In one or more of the various embodiments, lineage engines may be arranged to continue upwards traversal from node 810 to node 806. Further, if there may be shortcuts (e.g., Flow data type) the lineage engine may be arranged to generate those shortcuts to add them to the data model. In this example, Flow data type 808 is considered to be decorated with the persist shortcut indicator, so shortcut back to Flow node 808 may be generated and added to the data model. As described above, in some embodiments, lineage engines may be arranged to generate shortcut paths for ancestor nodes by recursively traversing to parent nodes of visited nodes. In this example, shortcuts may be generated for data type node 806, data type node 802 (Table) and data type node 804 (Database). In this example, shortcuts are illustrated using dashed lines.

In some embodiments, at this point in the ingestion process, lineage engines may be arranged to terminate the upwards traversal because all upstream data type nodes have been visited.

Figure 8E:
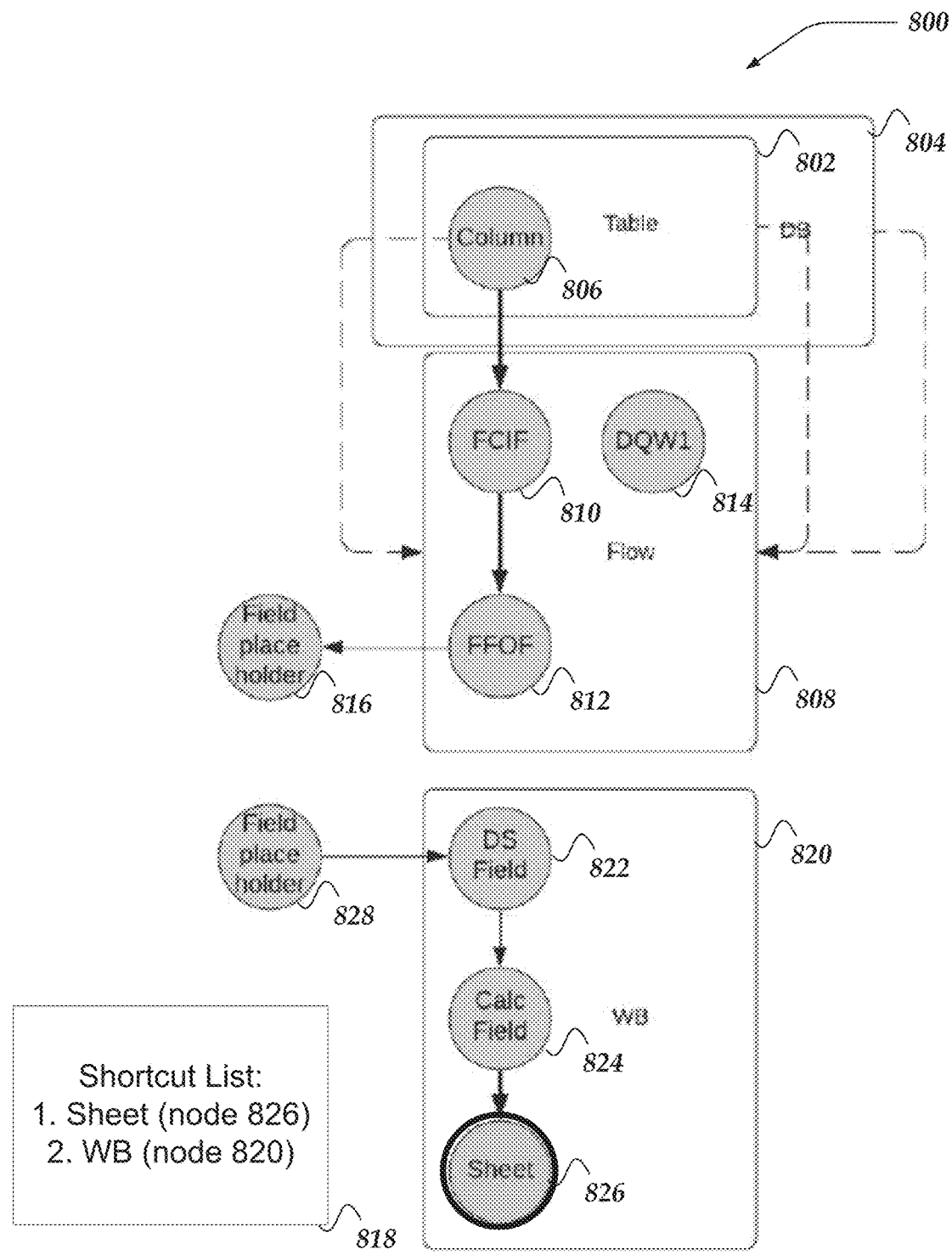
FIG. 8E illustrates a logical schematic of a data model for providing data flow directions for data objects in accordance with one or more of the various embodiments.

FIG. 8E illustrates a logical schematic of data model 800 for providing data flow directions for data objects in accordance with one or more of the various embodiments.

In some embodiments, as additional schema content may be provided, lineage engines may be arranged to determine one or more graphlets from the schema content. Accordingly, in some embodiments, data types that may be included in the graphlets may be incrementally added to data models.

In this example, another graphlet may be provided to the lineage engine to include in data model 800.

In this example, data type node 820 may be a container node that includes data type node 822, data type node 824, data type node 826. Also, in some embodiments, field placeholder node 828 may be included to reserve a position for subsequently added data types. Further, the schema content for data type 820 and data type 826 may be considered to be decorated with a persist shortcut indicator. Accordingly, in this example, the lineage engines may include data type node 826 (Sheet) and data type node 820 (WB) in shortcut list 818.

As described above, lineage engines may be arranged to determine the bottom leaf nodes that may be included in graphlet that includes data type 820. In this example, lineage engines may be arranged to data type 826 may be determined to the bottom leaf node of the graphlet.

Further, in this example, for some embodiments, the lineage engine may evaluate if there may be any downstream nodes that may be require evaluation. In this example, at this there are not any nodes downstream of data type node 826. Accordingly, the lineage engine may begin its upward traversal of data model 800 at data type node 826.

Figure 8F:
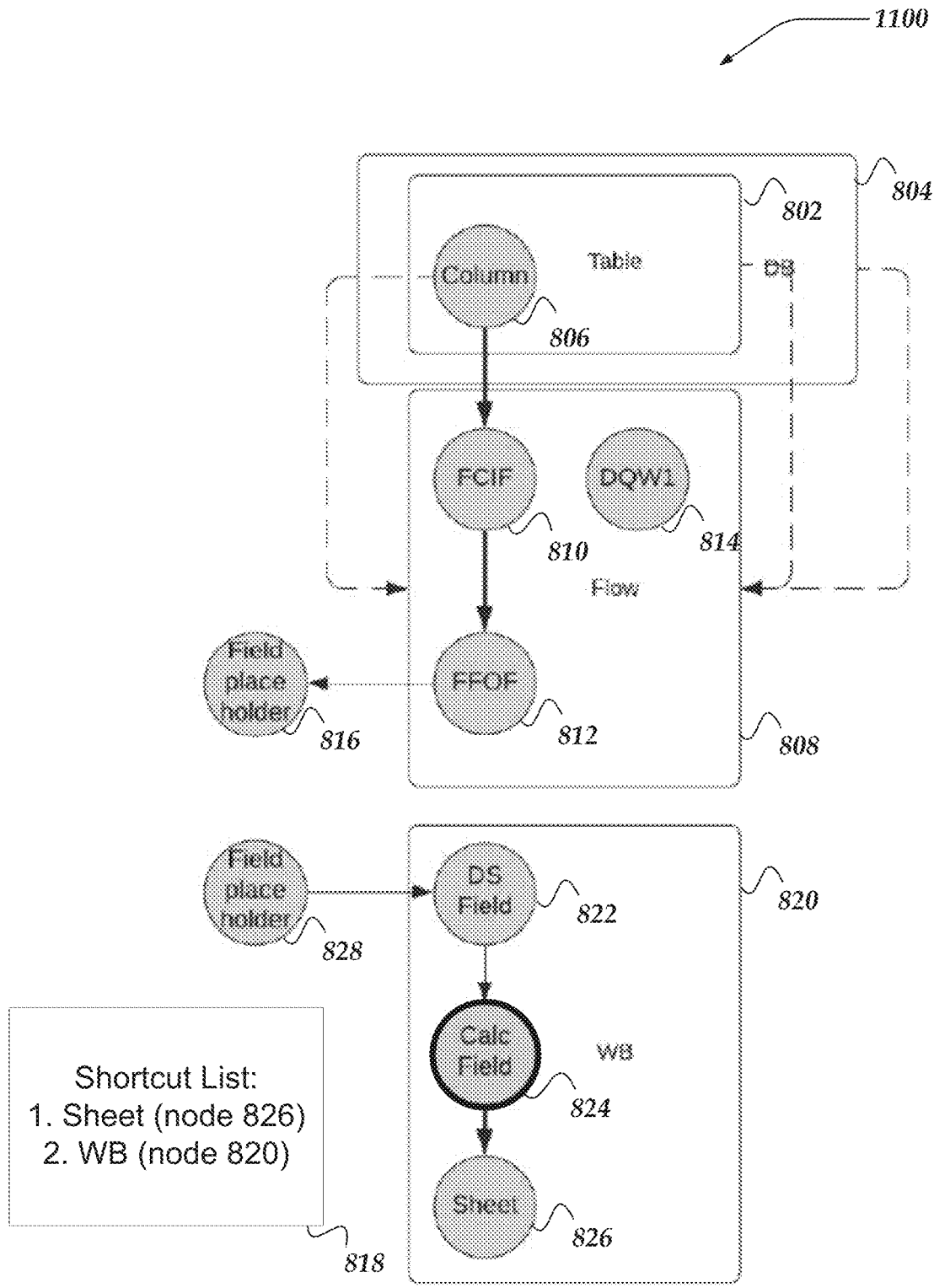
FIG. 8F illustrates a logical schematic of a data model for providing data flow directions for data objects in accordance with one or more of the various embodiments.

FIG. 8F illustrates a logical schematic of data model 800 for providing data flow directions for data objects in accordance with one or more of the various embodiments.

In some embodiments, lineage engines may be arranged to traverse upwards from the bottom leaf nodes (node 826). In this example, data type node 824 may be visited by the traversal. In some embodiments, lineage engines may be arranged to evaluate if the visited node may require a shortcut to be generated. However, in this case, data type node 824 may be considered to be connected to both data type node 826 (Sheet) and data type node 820 (WB), so the lineage engines may not be required to generate new shortcuts from those data types to data type node 824.

Figure 8G:
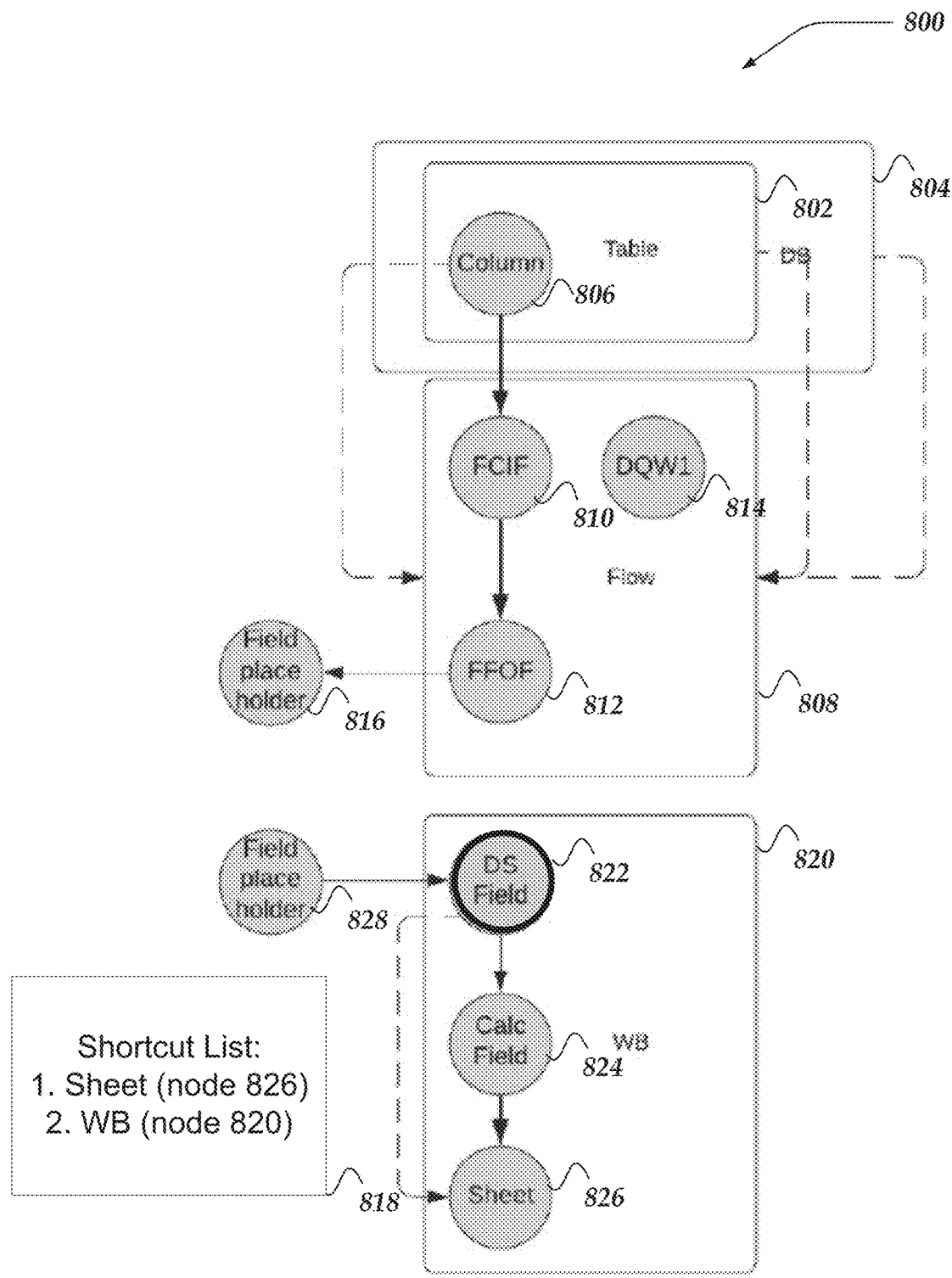
FIG. 8G illustrates a logical schematic of a data model for providing data flow directions for data objects in accordance with one or more of the various embodiments.

FIG. 8G illustrates a logical schematic of data model 800 for providing data flow directions for data objects in accordance with one or more of the various embodiments.

In this example, the lineage engines is visiting data type node 822 as it continues the upwards traversal through data model 800. In this example, data type node 822 may be connected to data type node 820 so the lineage engine does not have to generate a shortcut from data type node 820 to data type node 822. However, shortcut list also includes data type node 826. Accordingly, in some embodiments, the lineage engine may be arranged to generate a shortcut that connect data type node 822 with data type node 826 as indicated by the dashed line connecting the nodes.

And, in this example, because there are no more reachable upstream nodes, the traversal may be complete.

Figure 8H:
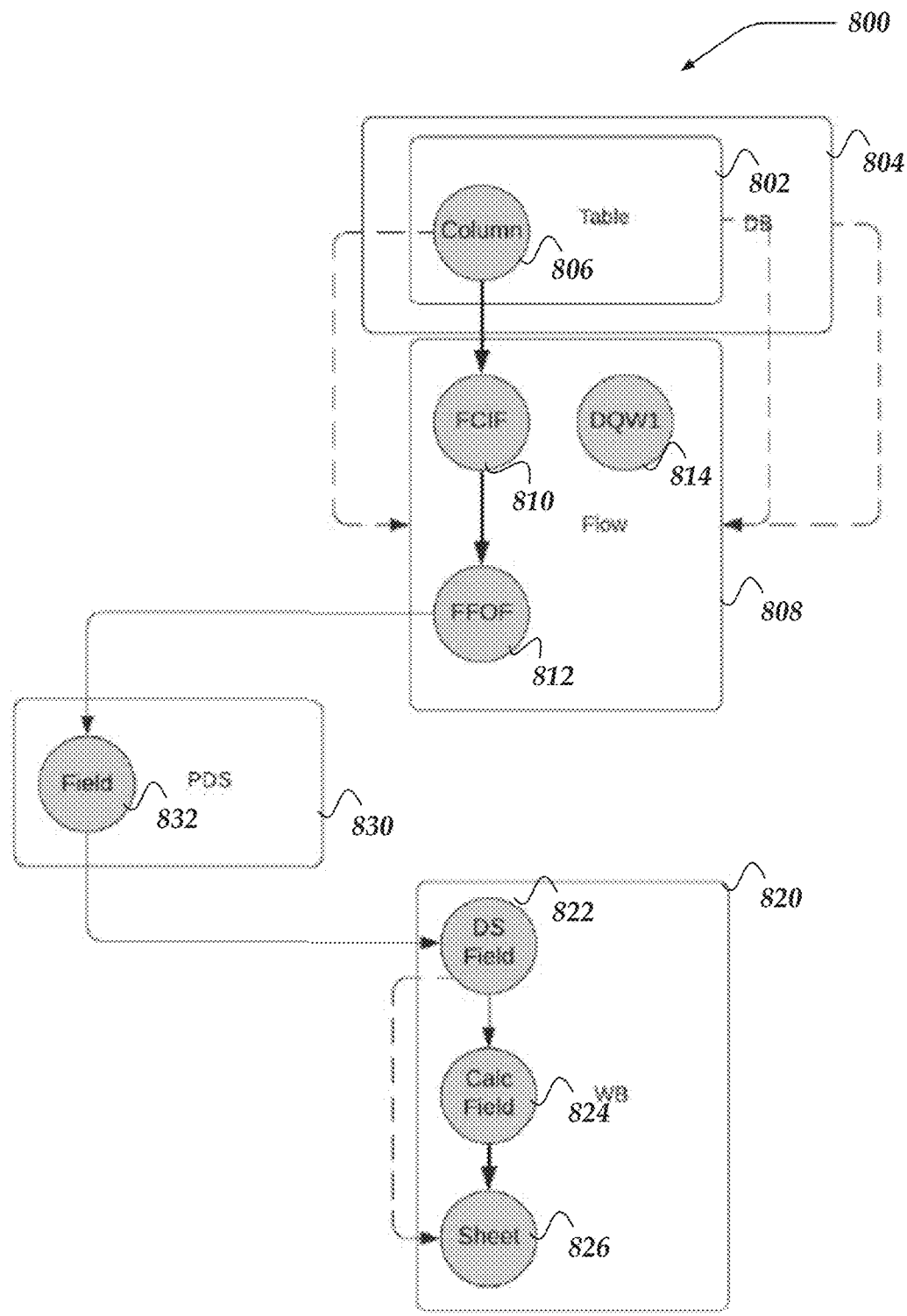
FIG. 8H illustrates a logical schematic of a data model for providing data flow directions for data objects in accordance with one or more of the various embodiments.

FIG. 8H illustrates a logical schematic of data model 800 for providing data flow directions for data objects in accordance with one or more of the various embodiments.

In this example, a graphlet that includes data type node 830 and data type node 832 may be provided to the lineage engine for inclusion in data model 800. As shown here, in some embodiments, subsequently provided graphlets may include one or more data type node that fill/replace previously designated placeholder nodes. In this example, placeholder node 816 and placeholder node 828 are removed from data model 800 because their edges are replaced by connections to data type node 832. Also, in this example, because data type node 830 nor data type node 832 are considered to be upstream or downstream of data type node 820 (Recall that data type node 820 and data type node 826 are assumed to be 'persist shortcut' nodes. Here the inclusion of data type node 830 to data model 800 does not introduce new nodes upstream or downstream of any current 'persist shortcut' nodes.

Figure 8I:
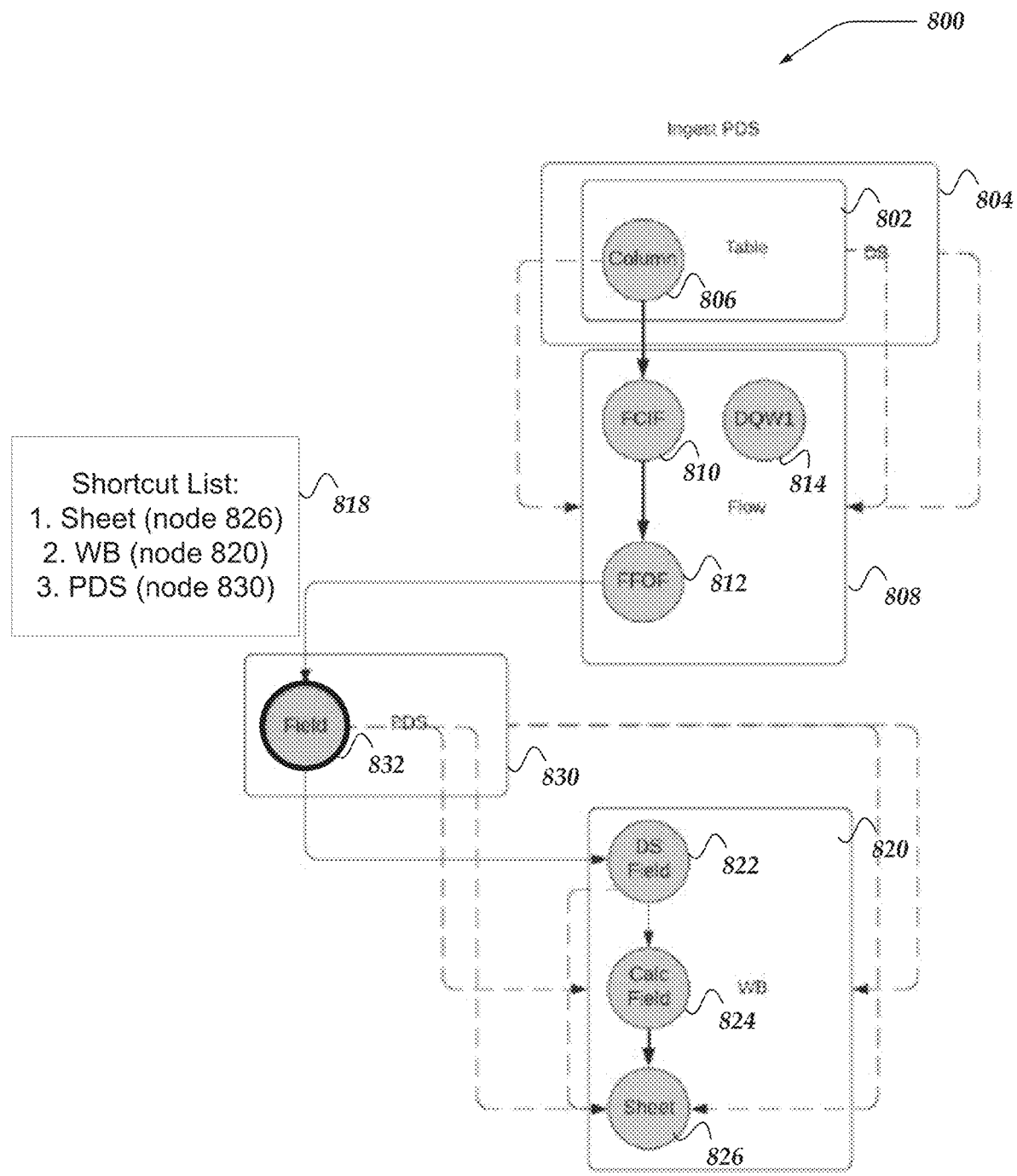
FIG. 8I illustrates a logical schematic of a data model for providing data flow directions for data objects in accordance with one or more of the various embodiments.

Further, in this example, data type node 830 may be considered to be designated as a shortcut node. In some embodiments, lineage engines may be arranged to automatically generate shortcut edges to shortcut nodes so designated. designated FIG. 8I illustrates a logical schematic of data model 800 for providing data flow directions for data objects in accordance with one or more of the various embodiments.

Similar to ingesting previously provided schema content. lineage engines may be arranged to determine the bottom leaf nodes of ingested graphlets. In this example, data type node 832 may be determined to be a bottom leaf node of the graphlet that includes data type node 830.

Accordingly, lineage engines may be arranged to visit data type node 832. The lineage engine may be arranged to determine directly connected nodes based on edge/relationship definition in schema content, in this example, data type node 822 is directly downstream of data type node 832.

The lineage engine may be arranged to determine one or more shortcuts associated with data type node 822 and included them in shortcut list 818. In this example, data type node 822 has a shortcut to data type node 826 because data type node 826 is a persist shortcut node. Accordingly, data type node 826 may be included in shortcut list 818.

Also, the lineage engine may be arranged to determine the parent of data type node 824 and add it to shortcut list if it is a persist shortcut data type. In this example, the parent of data type node 822 is data type node 820. And, as described above, data type node 820 is a persist shortcut node so it is included in the shortcut list.

Further, the lineage engine may be arranged to search for other shortcuts by determining one or more data type nodes that may be connected to data type node 822. In this example, the lineage engine may be arranged to determine that data type node 824 is directly connected to data type node 822. However, as mentioned above, data type node 824 is not designated a persist shortcut node, so data type node 824 is not added to shortcut list 818. Next, in this example, the lineage engine may be arranged to persist the remaining shortcuts for data type node 832 and data type node 830 as indicated by the dashed lines in FIG. 8I.

Further, data type node 832 is not a persist shortcut node, so it is omitted from shortcut list 818. However, in this example, the parent node of data type node 832 (data type node 830) is designated as a persist shortcut node, so it may be added to shortcut list 818.

Figure 8J:
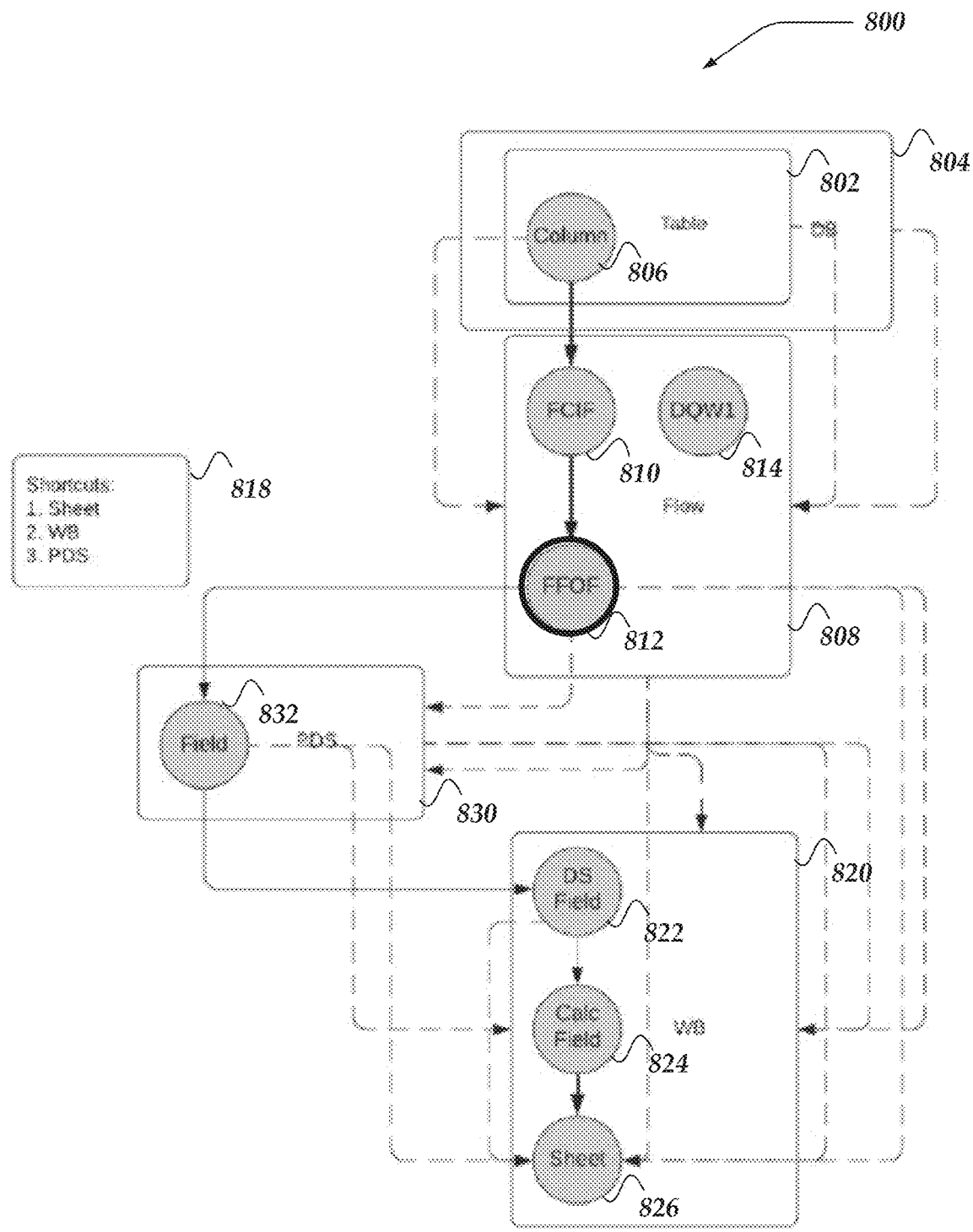
FIG. 8J illustrates a logical schematic of a data model for providing data flow directions for data objects in accordance with one or more of the various embodiments.

FIG. 8J illustrates a logical schematic of data model 800 for providing data flow directions for data objects in accordance with one or more of the various embodiments.

In this example, lineage engine may traverse from data type node 832 to an upstream connected type, data type node 812. Accordingly, while visiting data type node 812, the lineage engine may evaluate if data type node 812 has shortcuts to the data type in the shortcut list. In this example, this results in a new shortcut from data type node 812 to data type node 830, data type node 820, and data type node 826, because these three nodes are designated as shortcut nodes and they are not currently connected to data type node 812. Further, in this example, data type 808 is provided shortcuts to data type 830, data type node 826 and data type node 820 since it is the parent of data type 812.

Next, the lineage engine may continue its upwards traversal through data model 800 by visiting data type node 810.

Figure 8K:
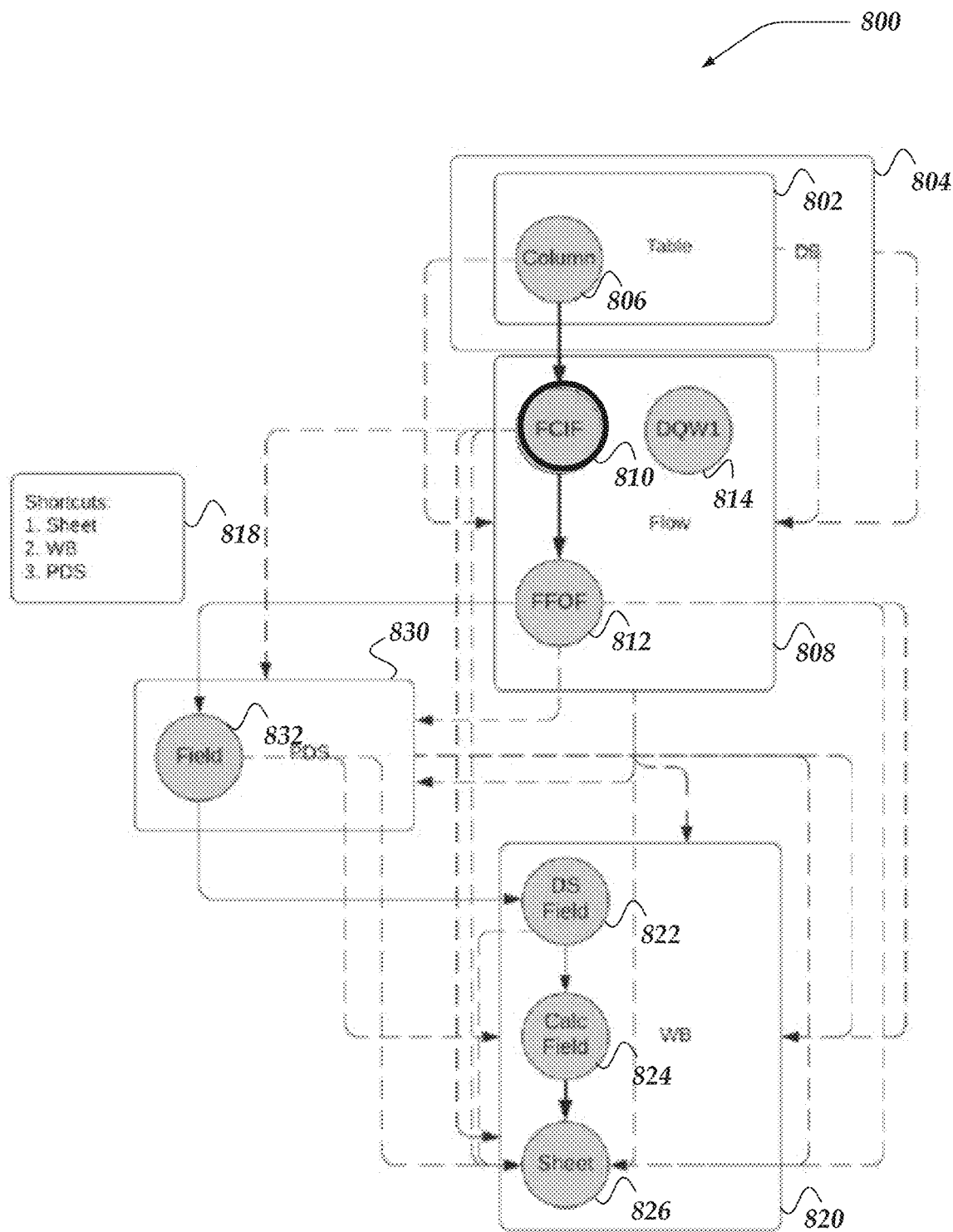
FIG. 8K illustrates a logical schematic of a data model for providing data flow directions for data objects in accordance with one or more of the various embodiments.

FIG. 8K illustrates a logical schematic of data model 800 for providing data flow directions for data objects in accordance with one or more of the various embodiments.

At this point in the ingestion process, lineage engine is visiting data type node 810. Accordingly, the lineage engine may be arranged to determine if shortcuts to data type nodes in shortcut list 818 need to be generated for data type node 810. In this example, the lineage engine may generate shortcuts from data type node 810 to data type node 830, data type node 820, and data type node 826 because data type node 810 is not otherwise connected to them. Likewise, the lineage engine may determine if the parent of data type node 810 requires shortcuts to be generated. However, in this example, data type node 808 already has shortcuts to each data type node in shortcut list, so the lineage engine does not generate more shortcuts here.

Next, the lineage engine may continue its upwards traversal through data model 800 by visiting data type node 806.

Figure 8L:
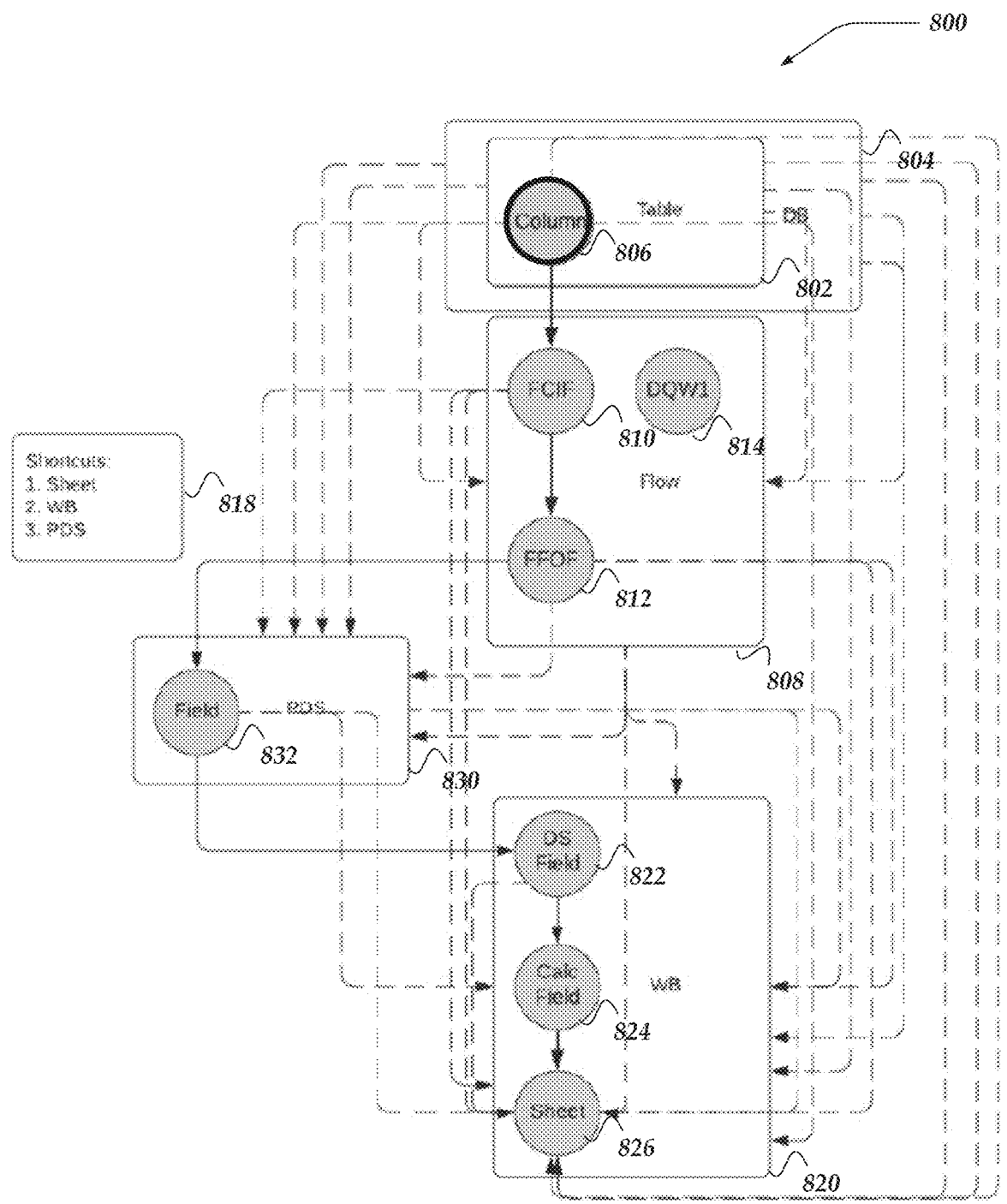
FIG. 8L illustrates a logical schematic of a data model for providing data flow directions for data objects in accordance with one or more of the various embodiments.

FIG. 8L illustrates a logical schematic of data model 800 for providing data flow directions for data objects in accordance with one or more of the various embodiments.

At this point in the ingestion process, lineage engine is visiting data type node 806. Accordingly, the lineage engine may be arranged to determine if shortcuts to data type nodes in shortcut list 818 may need to be generated for data type node 806.

In this example, the lineage engine may generate shortcuts from data type node 806 to data type node 830, data type node 820, and data type node 826 because data type node 806 is not otherwise connected to them.

Likewise, the lineage engine may determine if the parent(s) of data type node 806 require shortcuts to be generated. In this example, the lineage engine may generate shortcuts from data type node 802 to data type node 830, data type node 820, and data type node 826 because data type node 802 is not otherwise connected to them. Likewise, the lineage engine may generate shortcuts from data type node 804 (the parent of data type node 802) to data type node 830, data type node 820, and data type node 826 because data type node 804 is not otherwise connected to them.

As there are no more upstream nodes to visit, the traversal of data model 800 may be considered complete.

Generalized Operations

FIGS. 9-13 (13A-13C) represent generalized operations for providing data flow directions for data objects in accordance with one or more of the various embodiments. In one or more of the various embodiments, processes 900, 1000, 1100, 1200, and 1300 described in conjunction with FIGS. 9-13 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-13 (13A-13C) may be used for providing data flow directions for data objects in accordance with at least one of the various embodiments or architectures such as those described in conjunction with FIGS. 4-8 (8A-8L). Further, in one or more of the various embodiments, some or all of the actions performed by processes 900, 1000, 1100, 1200, and 1300 may be executed in part by data management engine 322, display engine 324, or lineage engine 326 running on one or more processors of one or more network computers.

Figure 9:
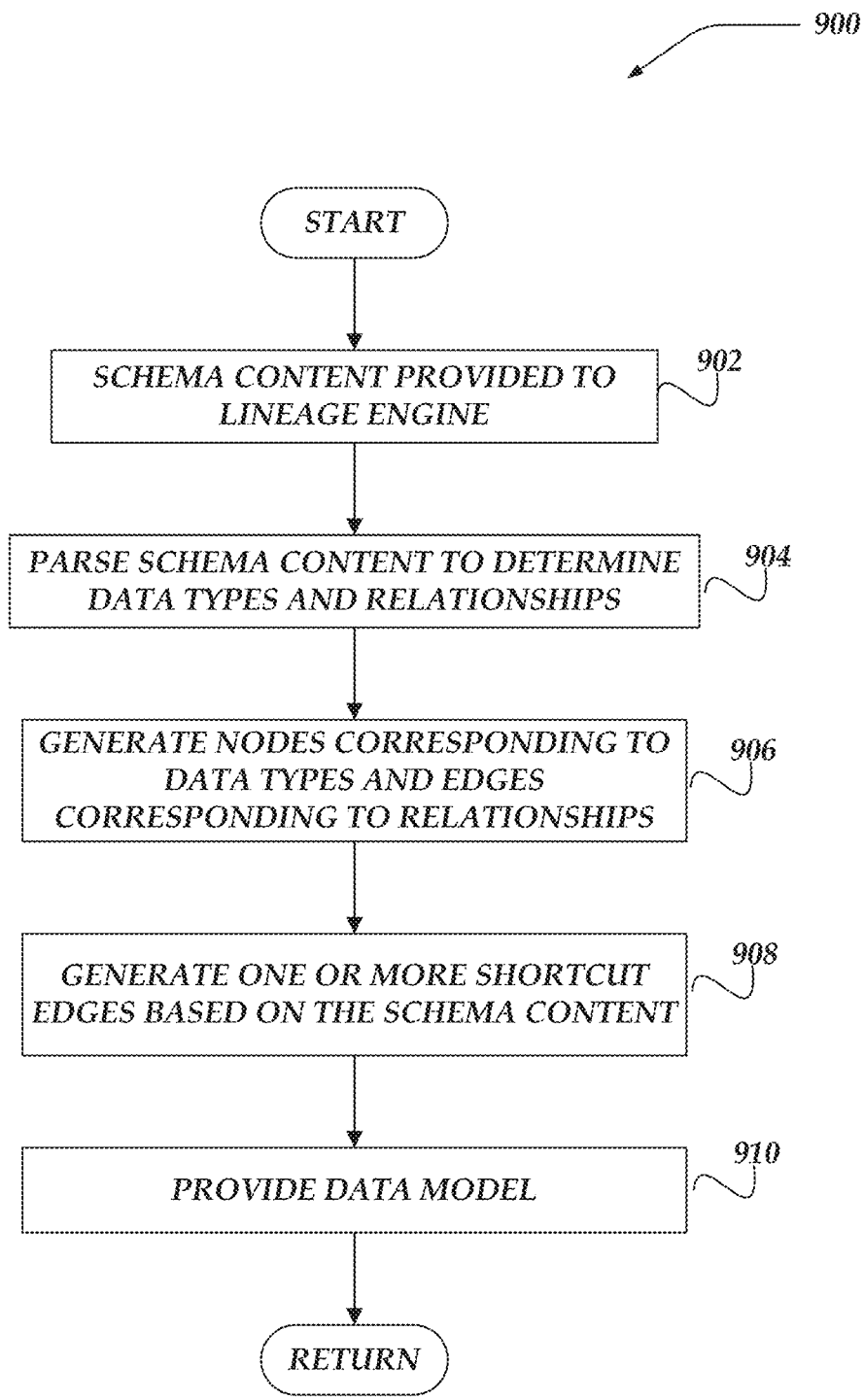
FIG. 9 illustrates an overview flowchart of a process for providing data flow directions for data objects in accordance with one or more of the various embodiments.

FIG. 9 illustrates an overview flowchart of process 900 for providing data flow directions for data objects in accordance with one or more of the various embodiments. After a start block, at block 902, schema content may be provided to a lineage engine. As described above, schema content may be provided by various data providers (or other users) that intend to integrate one or more data types or data type relationship into a data model for use by a visualization platform. In some cases, for some embodiments, the schema content may declare one or more data types or one or more data type relationships to integrate into an existing data model. Also, in some embodiments, schema content may declare one or more data types or one or more data type relationships to use for generating a new data model.

At block 904, in one or more of the various embodiments, the lineage engine may be arranged to parse the schema content to determine one or more data types, one or more data type relationships, or the like. As described above, schema content declares data types or data type relationships. Accordingly, in some embodiments, lineage engines may be arranged to determine one or more data types or data type relationships from the schema content.

At block 906, in one or more of the various embodiments, the lineage engine may be arranged to generate one or more nodes and one or more edges based on the schema content. In one or more of the various embodiments, lineage engines may be arranged to map data type nodes to data types and edges connecting data type nodes to data type relationships included in the schema content.

In one or more of the various embodiments, nodes or edges in schema content may be associated or grouped into one or more graphlets that each represent a portion of a graph (e.g., data type nodes and data type relationships edges) that correspond to schema content. In some cases, for some embodiments, schema content may declare data types or data type relationships for more than one graphlet. Accordingly, in some embodiments, separator indicators may be included in schema content to indicate different graphlets in the same portion of provided schema content.

In one or more of the various embodiments, schema content may include one or more hierarchy indicators that lineage engines may employ to determine data flows through a data model. Accordingly, in some embodiments, lineage engines may be arranged to determine the direction of relationship edges based on hierarchy information included in the schema content. In embodiments, hierarchy information may include one or more indicators that indicate data flow relationships, including parent-child, above-below, or attribute indicators.

At block 908, in one or more of the various embodiments, lineage engines may be arranged to generate one or more shortcut edges in the data model based on the schema content.

As described above, in some cases, schema content may declare one or more data types to be shortcut nodes. In some embodiments, lineage engines may be arranged to automatically generate shortcut edges from other nodes to shortcut nodes. In some embodiments, lineage engines may be arranged to generate shortcut edges from shortcut nodes to other nodes in the data model depending on various considerations described in more detail in FIG. 8A-8L.

At block 910, in one or more of the various embodiments, the lineage engine may be arranged to provide the data model to the visualization platform. As described above, data models may be used by visualization platforms to describe how data flows through the data types in a data model.

Next, in one or more of the various embodiments, control may be returned to a calling process.

Figure 10:
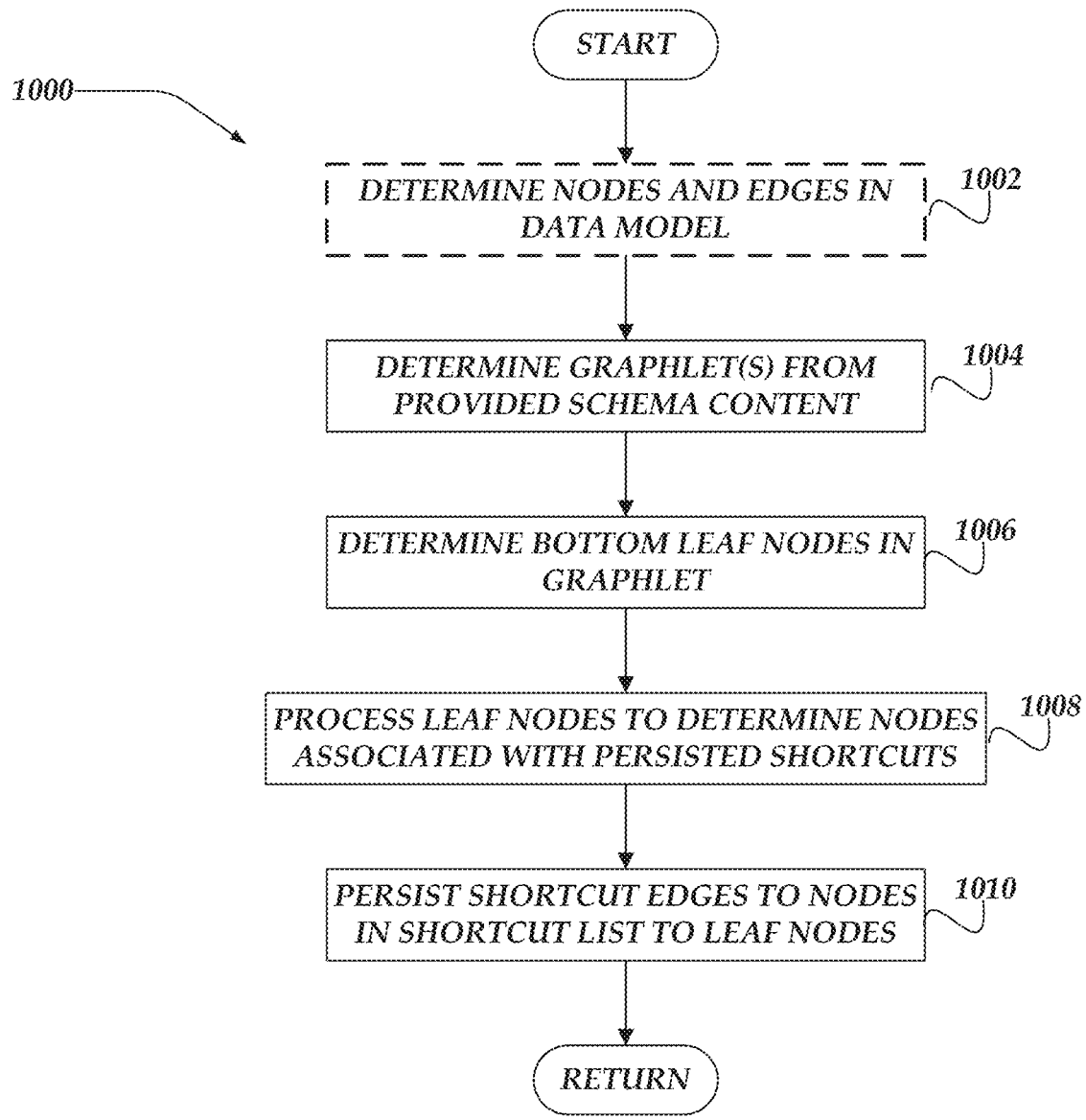
FIG. 10 illustrates a flowchart of a process for providing data flow directions for data objects in accordance with one or more of the various embodiments.

FIG. 10 illustrates an overview flowchart of process 1000 for providing data flow directions for data objects in accordance with one or more of the various embodiments. After a start block, at block 1002, in one or more of the various embodiments, optionally, lineage engines may be arranged to determine the one or more data type nodes and edges in a data model. In some embodiments, lineage engines may be provided a data model or portion of a data model that was previously generated.

Note, this block is marked as optional because in some cases for some embodiments a data model may not be available until a first portion of schema content may be ingested.

At block 1004, in one or more of the various embodiments, lineage engines may be arranged to determine one or more graphlets that may be included in schema content. As described above, one or more data providers or other users, may provide schema content that declares one or more data types, relationships, or the like. Also, as described above, schema content may also include hierarchy information that indicates various hierarchy information, such as, parent, child, above, below, or the like.

At block 1006, in one or more of the various embodiments, the lineage engines may be arranged to determine the one or more bottom leaf nodes in the current graphlet.

In one or more of the various embodiments, lineage engines may be arranged to determine bottom leaf based on various conditions. In some embodiments, lineage engines may be arranged to determine one or more data type nodes that do not have a parent in the graphlet may be ignored as external nodes. In some embodiments, these types of nodes may be existing external nodes or placeholder nodes.

In some embodiments, lineage engines may be arranged to determine nodes that have an edge only to a parent that is in the graphlet may be determined to be leaf nodes. In some embodiments, lineage engines may be arranged to determine that nodes that have edges only to a parent in the graphlet or to an external node may be identified as leaf nodes. And, in some embodiments, lineage engines may be arranged to determine leaf nodes based on determining the nodes that have edges only to a parent, one or more sibling and edges only to downstream external nodes.

At block 1008, in one or more of the various embodiments, the lineage engines may be arranged to iterate through the bottom leaf nodes to determine if they may be associated with other nodes that may be designated as shortcut nodes.

At block 1010, in one or more of the various embodiments, the lineage engines may be arranged to generate and persist the determined shortcuts.

Accordingly, in some embodiments, the data model may be updated to include shortcut edges that enable unambiguous traversals that may follow the data flow of the data represented in the data model.

Next, in one or more of the various embodiments, control may be returned to a calling process.

Figure 11:
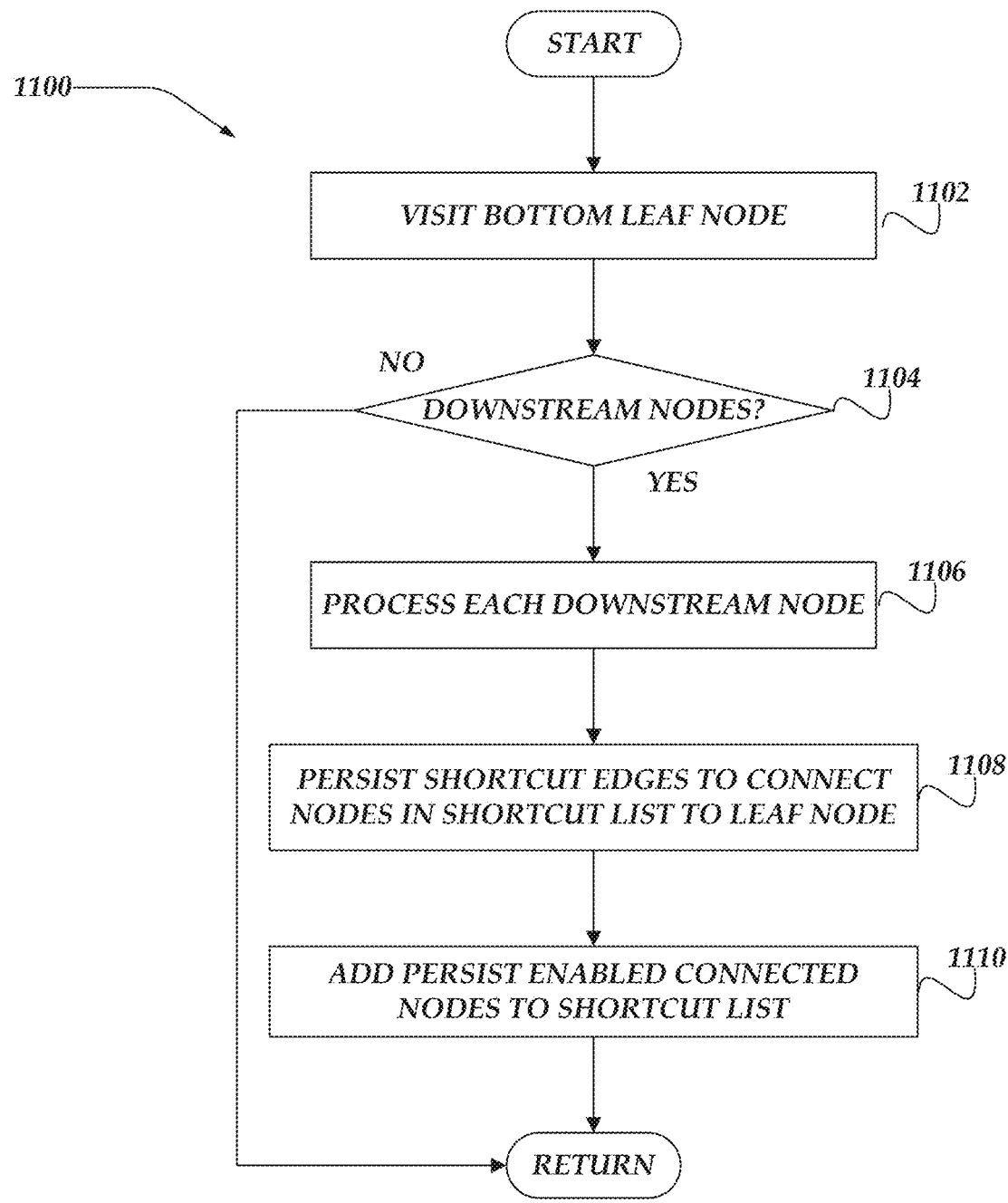
FIG. 11 illustrates a flowchart of a process for providing data flow directions for data objects in accordance with one or more of the various embodiments.

FIG. 11 illustrates an overview flowchart of process 1100 for providing data flow directions for data objects in accordance with one or more of the various embodiments. After a start block, at block 1102, in one or more of the various embodiments, lineage engines may be arranged to visit each bottom leaf node in a provided graphlet.

At decision block 1104, in one or more of the various embodiments, if there may be downstream data type nodes, control may flow to block 1106; otherwise, control may be returned to a calling process.

At block 1106, in one or more of the various embodiments, lineage engines may be arranged to process each downstream data type node.

Accordingly, in some embodiments, lineage engines may be arranged to determine one or more directly connected nodes that may be below this node. For each connected node, lineage engines may be arranged to collect its existing persisted shortcuts in shortcuts list. For each connected node, if a node is a shortcut node, lineage engines may be arranged to includes the node's parent and its attributes in the shortcuts list. Likewise, in some embodiments, for each connected node, if the node is a shortcut node, lineage engines may be arranged to include any directly connected sibling below in the shortcut list.

At block 1108, in one or more of the various embodiments, lineage engines may be arranged to persist one or more shortcut edges to connect data type nodes in shortcut list to leaf node.

In one or more of the various embodiments, lineage engines may be arranged to generate and store (in the data model) shortcut edges to the determined shortcut nodes.

At block 1110, in one or more of the various embodiments, lineage engines may be arranged to add shortcut data type nodes to the shortcut list.

Next, in one or more of the various embodiments, control may be returned to a calling process.

Figure 12:
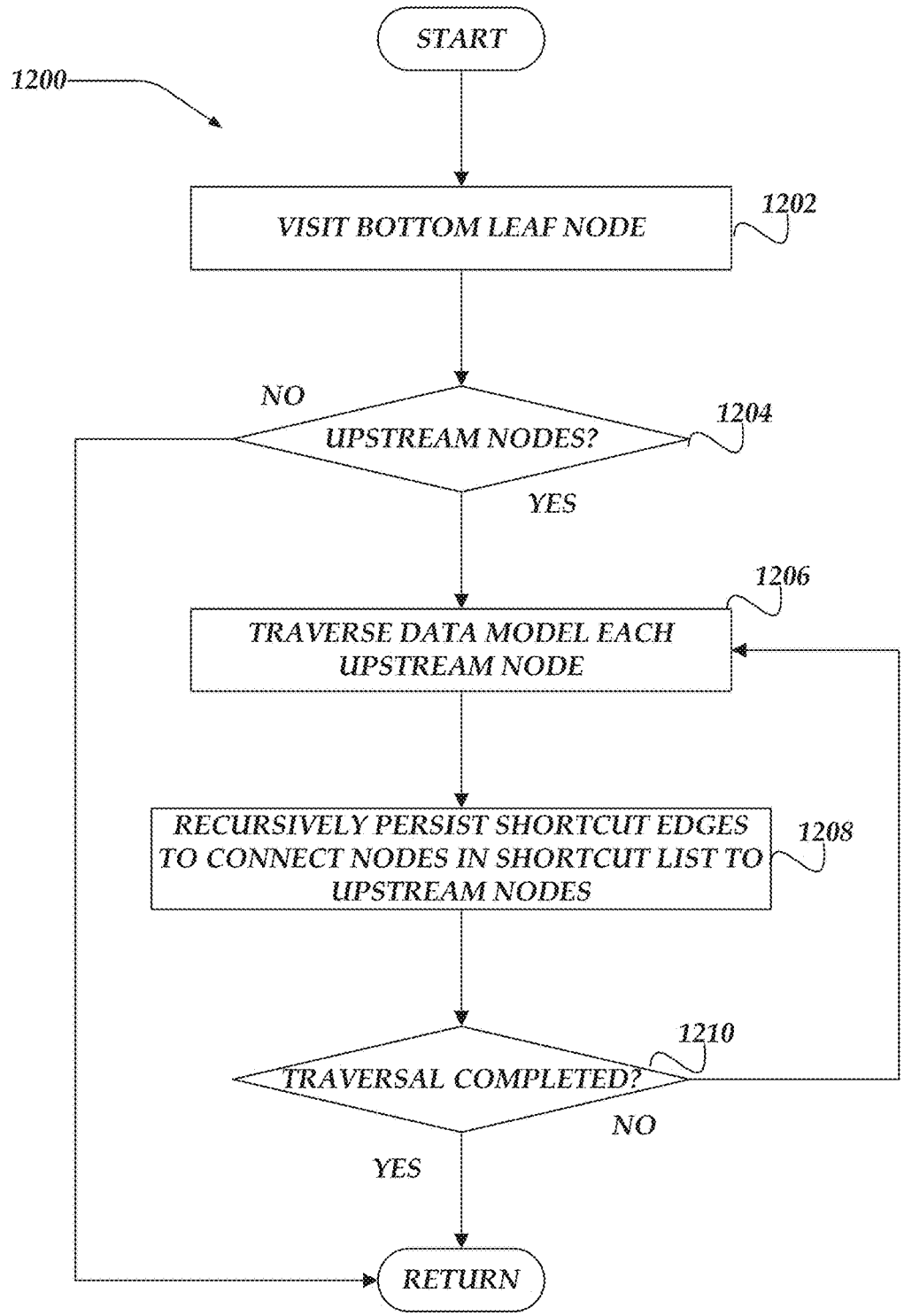
FIG. 12 illustrates a flowchart of a process for providing data flow directions for data objects in accordance with one or more of the various embodiments.

FIG. 12 illustrates an overview flowchart of process 1200 for providing data flow directions for data objects in accordance with one or more of the various embodiments. After a start block, at block 1202, in one or more of the various embodiments, lineage engines may be arranged to visit each bottom leaf node in a provided graphlet.

At decision block 1204, in one or more of the various embodiments, if there may be one or more upstream nodes, control may flow to block 1206; otherwise, control may be returned to a calling process.

At block 1206, in one or more of the various embodiments, lineage engines may be arranged to traverse the data model to visit upstream nodes.

At block 1208, in one or more of the various embodiments, lineage engines may be arranged to recursively persist shortcut edges to connect shortcut nodes in the shortcut list to upstream nodes.

In some embodiments, lineage engines may be arranged to traverse the data model to visit to each of the upstream nodes and persist shortcut edges to all shortcut nodes in the shortcuts list to the upstream nodes and its parents.

At decision block 1210, in one or more of the various embodiments, if the upstream traversal may be completed, control may be returned to a calling process; otherwise, control may be loop back to block 1206.

In some embodiments, lineage engines may be arranged to terminate the traversal of the data model if there may no more upstream nodes to visit. Or, in some embodiments, if any node already had shortcut to all nodes in the shortcuts list already. (This means there was another path which already persisted the shortcuts). Or, in some embodiments, if the origin leaf nodes may be visited during the traversal to avoid circular traversals.

Figure 13A:
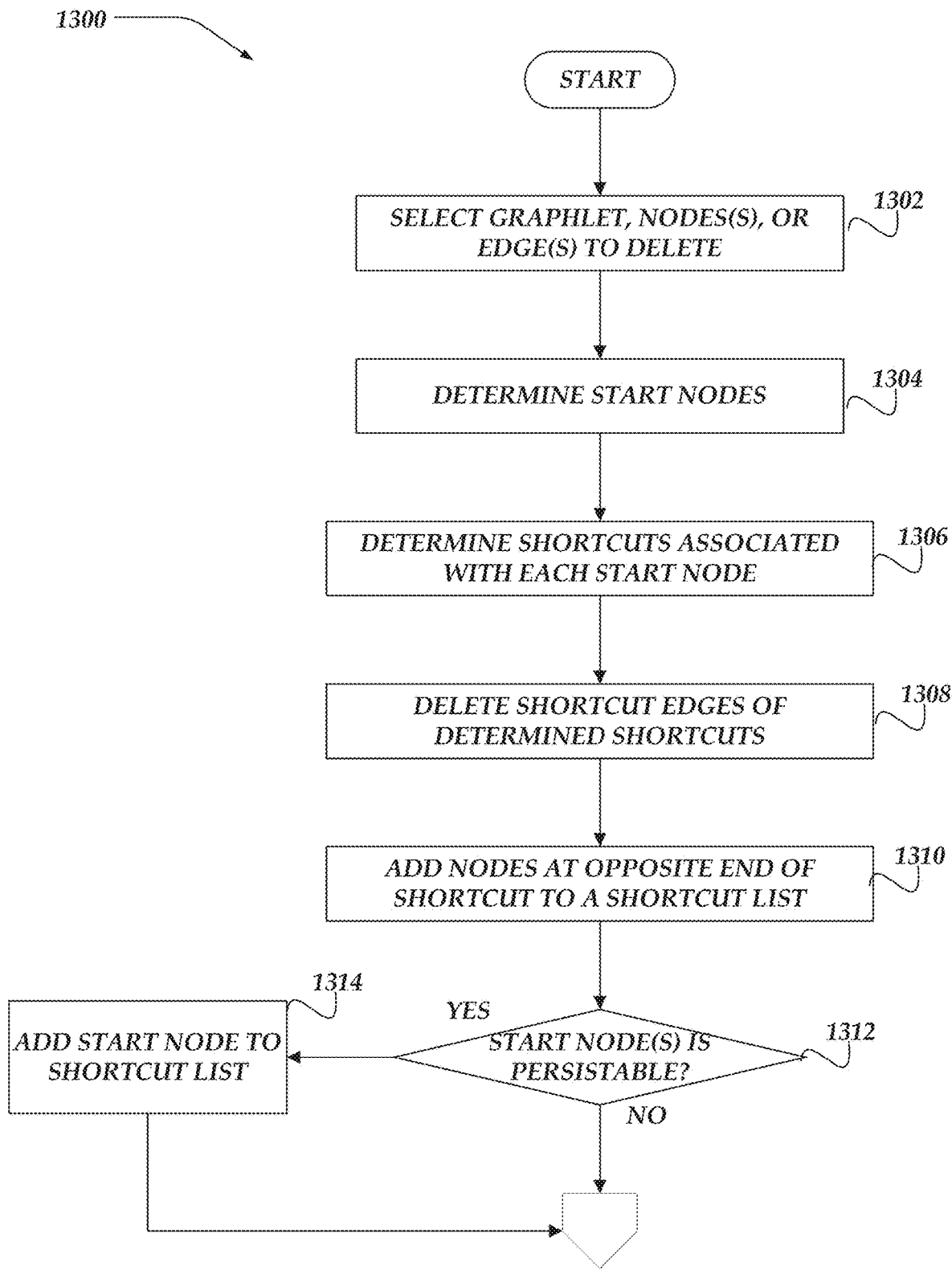
FIG. 13A illustrates a first portion of a flowchart of a process for providing data flow directions for data objects in accordance with one or more of the various embodiments.
Figure 13B:
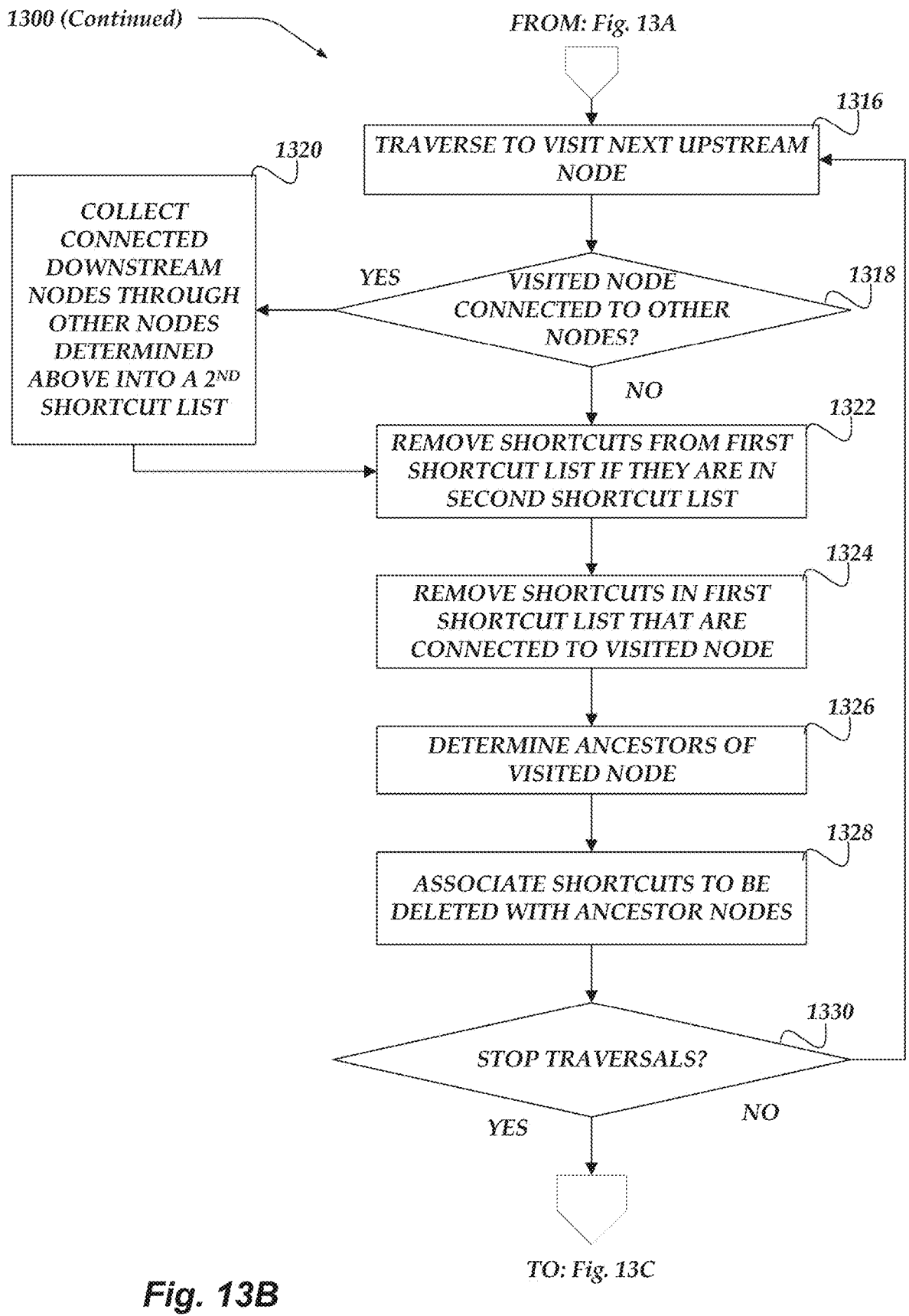
FIG. 13B illustrates a second portion of a flowchart of a process for providing data flow directions for data objects in accordance with one or more of the various embodiments.
Figure 13C:
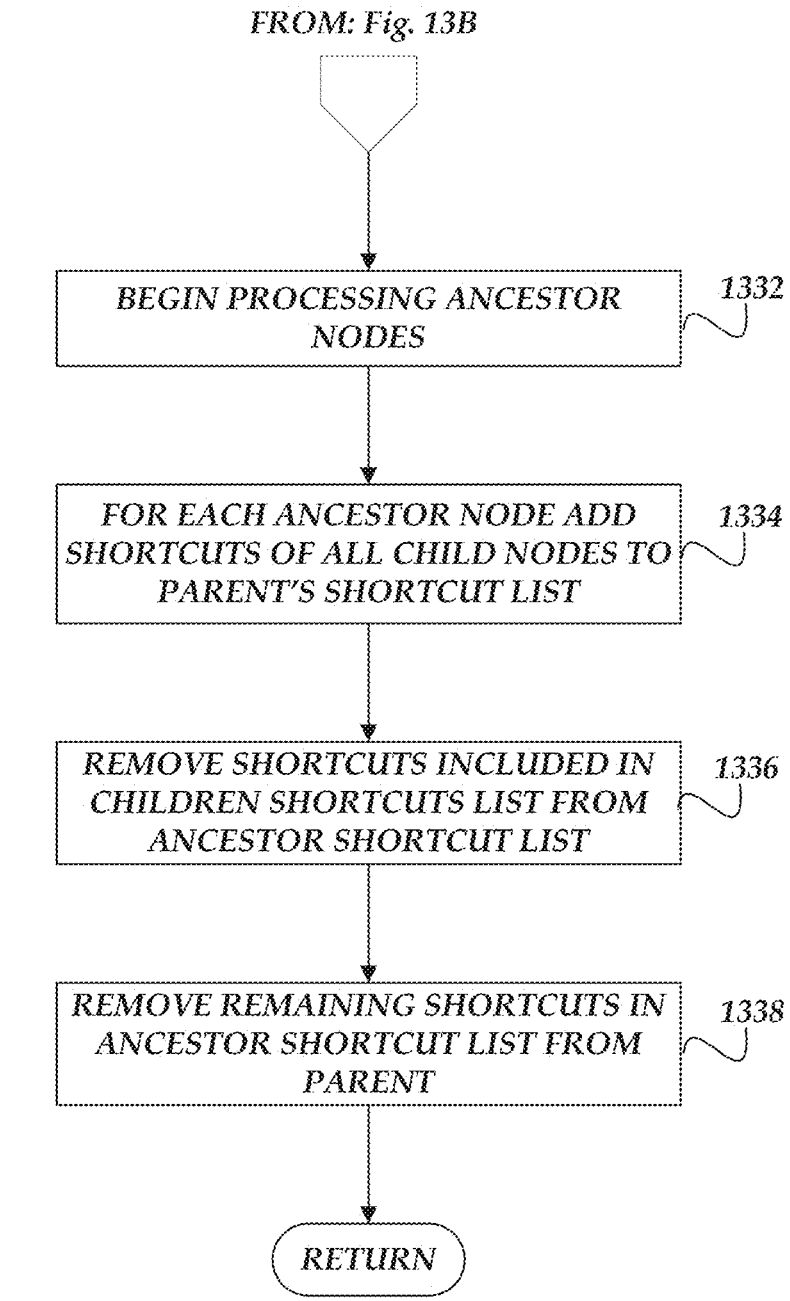
FIG. 13C illustrates a third portion of a flowchart of a process for providing data flow directions for data objects in accordance with one or more of the various embodiments.

FIGS. 13A-13C illustrates a flowchart of process 1300 for providing data flow directions for data objects in accordance with one or more of the various embodiments. After a start block, at block 1302, in one or more of the various embodiments, one or more graphlets, one or more nodes, or one or more edges may be selected for deletion, In one or more of the various embodiments, lineage engines may be arranged to enable one or more users to select one or more graphlets, one or more nodes, or one or more edges to delete or update. In some embodiments, lineage engines may be arranged to enable users to select one or more graphlets to update or delete. Accordingly, in some embodiments, lineage engines may be arranged to provide one or more user interfaces that enable users to interactively select nodes or graphlets. Likewise, in some embodiments, schema content that includes delete/update indicators may be provided in lieu of interactions via user interfaces.

At block 1304, in some embodiments, lineage engines may be arranged to determine one or more start nodes. In some embodiments, if a graphlet is being deleted, all nodes that may be associated with edges upstream to nodes external the selected graphlet may be determined. If one or more nodes are selected for deletion, the selected nodes may be considered the start nodes, and if am edge may be selected for deletion, bottom nodes associated with the deleted edge may be considered the start nodes.

At block 1306, in one or more of the various embodiments, lineage engines may be arranged to determine the shortcuts (if any) that may be associated with each start node.

At block 1308, in one or more of the various embodiments, lineage engines may be arranged to delete shortcut edges of the determined shortcuts for each visited start node.

At block 1310, in one or more of the various embodiments, lineage engines may be arranged to add nodes that may be at the opposite end of the shortcut to a shortcut list.

At decision block 1312, in one or more of the various embodiments, if a visited start nodes is peristable, control may flow to block 1314; otherwise, control may flow to block 1316 (in FIG. 13B).

At block 1316, in one or more of the various embodiments, lineage engines may be arranged to traverse from each start node to visit a next upstream node.

At decision block 1318, in one or more of the various embodiments, if a visited node may be connected to one or more nodes other than the previous node traversed from, control may flow to block 1320; otherwise, control may flow to block 1322.

At block 1320, in one or more of the various embodiments, lineage engines may be arranged to collect connected downstream nodes through the other nodes determined above into a second shortcut list.

At block 1322, in one or more of the various embodiments, lineage engines may be arranged to remove one or more shortcuts from the first shortcut list if they are also in the second shortcut list.

At block 1324, in one or more of the various embodiments, lineage engines may be arranged to remove one or more shortcuts in the first shortcut list that are connected to the visited node.

At block 1326, in one or more of the various embodiments, lineage engines may be arranged to determine one or more ancestors (if any) of the visited node. In some embodiments, ancestor nodes may be considered to be parent nodes, grandparent nodes, and so on.

At block 1328, in one or more of the various embodiments, lineage engines may be arranged to associate the first list of shortcuts to the ancestor nodes of the visited node.

At decision block 1330, in one or more of the various embodiments, if the traversals should be stopped, control may flow to block 1332 (in FIG. 13C); otherwise, control may loop back to block 1316.

In one or more of the various embodiments, lineage engines may be arranged to determine that traversal should be stopped based on: if the shortcut list is empty; if there are no more nodes to traverse; or if the traversal reaches the origin node.

At block 1332, in one or more of the various embodiments, lineage engines may be arranged to begin processing the ancestor nodes that were determined during the traversals.

At block 1334, in one or more of the various embodiments, for each ancestor node, lineage engines may be arranged to add the shortcuts of their corresponding child nodes to an ancestor shortcut list.

At block 1336, in one or more of the various embodiments, lineage engines may be arranged to remove the shortcuts included in the children' shortcut list from the ancestor shortcut list.

At block 1338, in one or more of the various embodiments, lineage engines may be arranged to remove the remaining shortcuts in the ancestor shortcut list from the visited ancestor node.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data using one or more processors that are configured to execute instructions, wherein the execution of the instructions performs actions, comprising:

providing a data model that includes one or more data types and one or more data type relationships, wherein each data type is represented by a node in the data model and each data type relationship is represented by an edge in the data model;

providing a graphlet that includes one or more other data types and one or more other data type relationships that are absent from the data model, wherein the one or more other data types are included as one or more nodes in the data model and the one or more other data type relationships are included as one or more edges in the data model;

determining which of the data types are to be assigned a persist shortcut indicator;

labeling the nodes assigned a shortcut indicator as shortcut nodes; and in response to determining a first portion of the one or more nodes in the data model downstream of one or more leaf nodes in the graphlet, performing further actions, including:

traversing the data model to visit the one or more downstream nodes;

generating one or more shortcut edges for each downstream node visited in the downstream traversal to the one or more shortcut nodes upon determination that the downstream node and the one or more shortcut nodes are not connected; and in response to determining a second portion of the one or more nodes in the data model upstream of the one or more leaf nodes, performing further actions, including:

traversing the data model upwards from the one or more leaf nodes;

generating one or more other shortcut edges for each upstream node visited in the upwards traversal to the one or more shortcut nodes upon determination that the upstream nodes and the one or more shortcut nodes are not connected; and in response to a query that includes a source data type and a target data type, employing the one or more shortcut edges or the one or more other shortcut edges to provide a path in the data model from the source data type to the target data type.

2. The method of claim 1, further comprising:

determining a first portion of the one or more leaf nodes in the graphlet based on each leaf node in the first portion having an edge to its parent node; and determining a second portion of the one or more leaf nodes in the graphlet based on each leaf node in the second portion having a first edge to its parent node and a second edge to another node outside of the graphlet.

3. The method of claim 1, wherein providing the graphlet that includes the one or more other data types and the one or more other data type relationships further comprises:

determining a direction of the one or more edges that associate the one or more other data types with the data model based on a hierarchy indicator included in schema content that corresponds to the graphlet, wherein the hierarchy indicator declares one or more parent-child relationships between one or more of the one or more data types or the one or more other data types.

4. The method of claim 1, further comprising:

providing schema content that declares one or more hierarchy indicators for one or more of the other data type relationships, wherein the one or more hierarchy indicators include, parent, child, above, below, or attribute; and determining a direction of the one or more other edges based on the one or more hierarchy indicators that include parent or child, wherein each other edge is associated with a parent hierarchy indicator that runs from a parent node to a child node, wherein each other edge associated with an above hierarchy indicator runs in the downstream direction of the data model, and each other edge associated with a below hierarchy indicator runs in the upstream direction of the data model.

5. The method of claim 1, wherein generating the one or more shortcut nodes further comprises:
providing schema content that declares the one or more other data types and the one or more other data type relationships, wherein the schema content declares one or more of the one other data types to correspond to shortcut nodes in the data model.

6. The method of claim 1, wherein providing the data model further comprises:
providing one or more compound data types that are comprised of two or more data types; and
providing more than one node in the data model that represent a same data type.

7. The method of claim 1, further comprising:
determining one or more delete nodes from the data model to remove from the data model; and
removing each shortcut edge that is exclusively associated with the one or more delete nodes from the data model.

8. A system for managing data:
a network computer, comprising:
a memory that stores at least instructions; and
one or more processors that execute instructions that perform actions, including:
providing a data model that includes one or more data types and one or more data type relationships, wherein each data type is represented by a node in the data model and each data type relationship is represented by an edge in the data model;
providing a graphlet that includes one or more other data types and one or more other data type relationships that are absent from the data model, wherein the one or more other data types are included as one or more nodes in the data model and the one or more other data type relationships are included as one or more edges in the data model;
determining which of the data types to be assigned a persist shortcut indicator;
labeling the nodes assigned a shortcut indicator as shortcut nodes; and
in response to determining a first portion of the one or more nodes in the data model downstream of one or more leaf nodes in the graphlet, performing further actions, including:
traversing the data model to visit the one or more downstream nodes;
generating one or more shortcut edges for each downstream node visited in the downstream traversal to the one or more shortcut nodes upon determination that the downstream node and the one or more shortcut nodes are not connected; and
in response to determining a second portion of the one or more nodes in the data model upstream of the one or more leaf nodes, performing further actions, including:
traversing the data model upwards from the one or more leaf nodes;
generating one or more other shortcut edges for each upstream nodes visited in the upwards traversal to the one or more shortcut nodes upon determination that the upstream node and the one or more shortcut nodes are not connected; and
in response to a query that includes a source data type and a target data type, employing the one or more shortcut edges or the one or more other shortcut edges to provide a path in the data model from the source data type to the target data type; and
a client computer, comprising:
a memory that stores at least instructions; and
one or more processors that execute instructions that perform actions, including:
providing one or more of the query or the graphlet.

9. The system of claim 8, the actions further comprising:
determining a first portion of the one or more leaf nodes in the graphlet based on each leaf node in the first portion having an edge to its parent node; and
determining a second portion of the one or more leaf nodes in the graphlet based on each leaf node in the second portion having a first edge to its parent node and a second edge to another node outside of the graphlet.

10. The system of claim 8, wherein providing the graphlet that includes the one or more other data types and the one or more other data type relationships further comprises:
determining a direction of the one or more edges that associate the one or more other data types with the data model based on a hierarchy indicator included in schema content that corresponds to the graphlet, wherein the hierarchy indicator declares one or more parent-child relationships between one or more of the one or more data types or the one or more other data types.

11. The system of claim 8, the actions further comprising:
providing schema content that declares one or more hierarchy indicators for one or more of the other data type relationships, wherein the one or more hierarchy indicators include, parent, child, above, below, or attribute; and
determining a direction of the one or more other edges based on the one or more hierarchy indicators that include parent or child, wherein each other edge associated with a parent hierarchy indicator that runs from a parent node to a child node, wherein each other edge associated with an above hierarchy indicator runs in the downstream direction of the data model and each other edge associated with a below hierarchy indicator runs in the upstream direction of the data model.

12. The system of claim 8, wherein generating the one or more shortcut nodes further comprises:
providing schema content that declares the one or more other data types and the one or more other data type relationships, wherein the schema content declares one or more of the one other data types to correspond to shortcut nodes in the data model.

13. The system of claim 8, wherein providing the data model further comprises:
providing one or more compound data types that are comprised of two or more data types; and
providing more than one node in the data model that represent a same data type.

14. The system of claim 8, the actions further comprising:
determining one or more delete nodes from the data model to remove from the data model; and
removing each shortcut edge that is exclusively associated with the one or more delete nodes from the data model.

15. A processor readable non-transitory storage media that includes instructions for managing data, wherein execution of the instructions by one or more processors, performs actions, comprising:

providing a data model that includes one or more data types and one or more data type relationships, wherein each data type is represented by a node in the data model and each data type relationship is represented by an edge in the data model;

providing a graphlet that includes one or more other data types and one or more other data type relationships that are absent from the data model, wherein the one or more other data types are included as one or more nodes in the data model and the one or more other data type relationships are included as one or more edges in the data model;

determining which of the data types are to be assigned a persist shortcut indicator;

labeling the nodes assigned a shortcut indicator as shortcut nodes; and in response to determining a first portion of the one or more nodes in the data model downstream of one or more leaf nodes in the graphlet, performing further actions, including:

traversing the data model to visit the one or more downstream nodes;

generating one or more shortcut edges for each downstream node visited in the downstream traversal to the one or more shortcut nodes upon determination that the downstream node and the one or more shortcut nodes are not connected; and in response to determining a second portion of the one or more nodes in the data model upstream of the one or more leaf nodes, performing further actions, including:

traversing the data model upwards from the one or more leaf nodes;

generating one or more other shortcut edges for each upstream nodes visited in the upwards traversal to the one or more shortcut nodes upon determination that the upstream node and the one or more shortcut nodes are not connected; and in response to a query that includes a source data type and a target data type, employing the one or more shortcut edges or the one or more other shortcut edges to provide a path in the data model from the source data type to the target data type.

16. The media of claim 15, the actions further comprising:
determining a first portion of the one or more leaf nodes in the graphlet based on each leaf node in the first portion having an edge to its parent node; and determining a second portion of the one or more leaf nodes in the graphlet based on each leaf node in the second portion having a first edge to its parent node and a second edge to another node outside of the graphlet.

17. The media of claim 15, wherein providing the graphlet that includes the one or more other data types and the one or more other data type relationships further comprises:

determining a direction of the one or more edges that associate the one or more other data types with the data model based on a hierarchy indicator included in schema content that corresponds to the graphlet, wherein the hierarchy indicator declares one or more parent-child relationships between one or more of the one or more data types or the one or more other data types.

18. The media of claim 15, the actions further comprising:
providing schema content that declares one or more hierarchy indicators for one or more of the other data type relationships, wherein the one or more hierarchy indicators include, parent, child, above, below, or attribute; and determining a direction of the one or more other edges based on the one or more hierarchy indicators that include parent or child, wherein each other edge associated with a parent hierarchy indicator that runs from a parent node to a child node, wherein each other edge associated with an above hierarchy indicator runs in the downstream direction of the data model and each other edge associated with a below hierarchy indicator runs in the upstream direction of the data model.

19. The media of claim 15, wherein generating the one or more shortcut nodes in the data model based on the graphlet further comprises:

providing schema content that declares the one or more other data types and the one or more other data type relationships, wherein the schema content declares one or more of the one other data types to correspond to shortcut nodes in the data model.

20. The media of claim 15, the actions further comprising:
determining one or more delete nodes from the data model to remove from the data model; and removing each shortcut edge that is exclusively associated with the one or more delete nodes from the data model.

* * * * *